(12) United States Patent
Yasui et al.

(10) Patent No.: US 11,767,907 B2
(45) Date of Patent: Sep. 26, 2023

(54) POWER TRANSMISSION DEVICE

(71) Applicants: JATCO LTD, Fuij (JP); Nissan Motor Co., Ltd., Yokohama (JP)

(72) Inventors: Kenjiro Yasui, Shizuoka (JP); Yusuke Suzuki, Shizuoka (JP); Takayoshi Urushibata, Shizuoka (JP)

(73) Assignees: Jatco Ltd, Fuji (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/791,679

(22) PCT Filed: Dec. 23, 2020

(86) PCT No.: PCT/JP2020/048067
§ 371 (c)(1),
(2) Date: Jul. 8, 2022

(87) PCT Pub. No.: WO2021/157235
PCT Pub. Date: Aug. 12, 2021

(65) Prior Publication Data
US 2023/0044631 A1 Feb. 9, 2023

(30) Foreign Application Priority Data
Feb. 6, 2020 (JP) .................................. 2020-018993

(51) Int. Cl.
*F16H 57/04* (2010.01)
*F16H 57/037* (2012.01)
*F16H 57/02* (2012.01)

(52) U.S. Cl.
CPC ....... *F16H 57/0415* (2013.01); *F16H 57/037* (2013.01); *F16H 57/0482* (2013.01);
(Continued)

(58) Field of Classification Search
CPC .............. F16H 57/0415; F16H 57/037; F16H 57/0482; F16H 2057/02034; F16H 2057/02052
(Continued)

(56) References Cited

U.S. PATENT DOCUMENTS

| | | | | |
|---|---|---|---|---|
| 1,530,205 A | * | 3/1925 | Ruckstell | F16H 57/028 475/314 |
| 6,059,684 A | * | 5/2000 | Sasaki | B60K 1/00 180/65.6 |

(Continued)

FOREIGN PATENT DOCUMENTS

| DE | 10 2010 009 029 A1 | 8/2011 |
|---|---|---|
| JP | S62-018499 U1 | 2/1987 |

(Continued)

*Primary Examiner* — Colby M Hansen
(74) *Attorney, Agent, or Firm* — Global IP Counselors, LLP

(57) ABSTRACT

A power transmission device includes a motor, a gear mechanism connected downstream of the motor and lubricated by oil, and a box. The box has a wall part that covers an outer circumference of the gear mechanism, and a jacket part that covers an outer circumference of the wall part. A cooling chamber, in which cooling liquid is introduced, is formed between the wall part and the jacket part. The cooling chamber includes a portion that overlaps with the gear mechanism when seen from a radial direction, and a portion that overlaps the gear mechanism when seen from an axial direction.

10 Claims, 15 Drawing Sheets

(52) U.S. Cl.
CPC ............. *F16H 2057/02034* (2013.01); *F16H 2057/02052* (2013.01)

(58) Field of Classification Search
USPC ........................................................ 475/149
See application file for complete search history.

(56) References Cited

U.S. PATENT DOCUMENTS

| | | | | |
|---|---|---|---|---|
| 2009/0088287 | A1* | 4/2009 | Chludek | B60K 23/04 |
| | | | | 475/246 |
| 2013/0047779 | A1* | 2/2013 | Martin, III | F16H 48/24 |
| | | | | 29/893.1 |
| 2013/0274053 | A1* | 10/2013 | Bauerlein | H02K 7/14 |
| | | | | 310/67 R |

FOREIGN PATENT DOCUMENTS

| | | |
|---|---|---|
| JP | S62-278371 A | 12/1987 |
| JP | H05-096959 A | 4/1993 |
| JP | H08-240254 A | 9/1996 |
| JP | 2009-171767 A | 7/2009 |
| JP | 2018-058501 A | 4/2018 |

\* cited by examiner

_US 11,767,907 B2_

POWER TRANSMISSION DEVICE

CROSS-REFERENCE TO RELATED APPLICATIONS

This is a U.S. national phase application of PCT/JP2020/048067, filed on Dec. 23, 2020, which claims priority to Japanese Patent Application No. 2020-018993, filed on Feb. 6, 2020. The entire disclosure of Japanese Patent Application No. 2020-018993 is hereby incorporated herein by reference.

TECHNICAL FIELD

The present invention relates to a power transmission device.

BACKGROUND ART

Disclosed in Japanese Laid-Open Patent Publication No. H08-240254 is a power transmission device for an electric automobile that has a bevel gear type differential mechanism and a planetary gear mechanism.

This planetary gear mechanism comprises a stepped pinion gear having a large pinion gear and a small pinion gear.

SUMMARY

In a power transmission device, there is a desire to increase the cooling efficiency of oil for lubrication supplied to constituent components.

A power transmission device according to one embodiment comprises a motor, a gear mechanism connected downstream of the motor, and a box that houses the gear mechanism, wherein a first chamber in which the gear mechanism and oil OL are housed is formed in the box, and a second chamber that is adjacent to the first chamber and in which cooling liquid is introduced is formed in the box.

According to a mode of the present invention, it is possible to increase oil cooling efficiency.

DETAILED DESCRIPTION OF EMBODIMENTS

Following, an embodiment of the present invention is explained.

Figure 1:
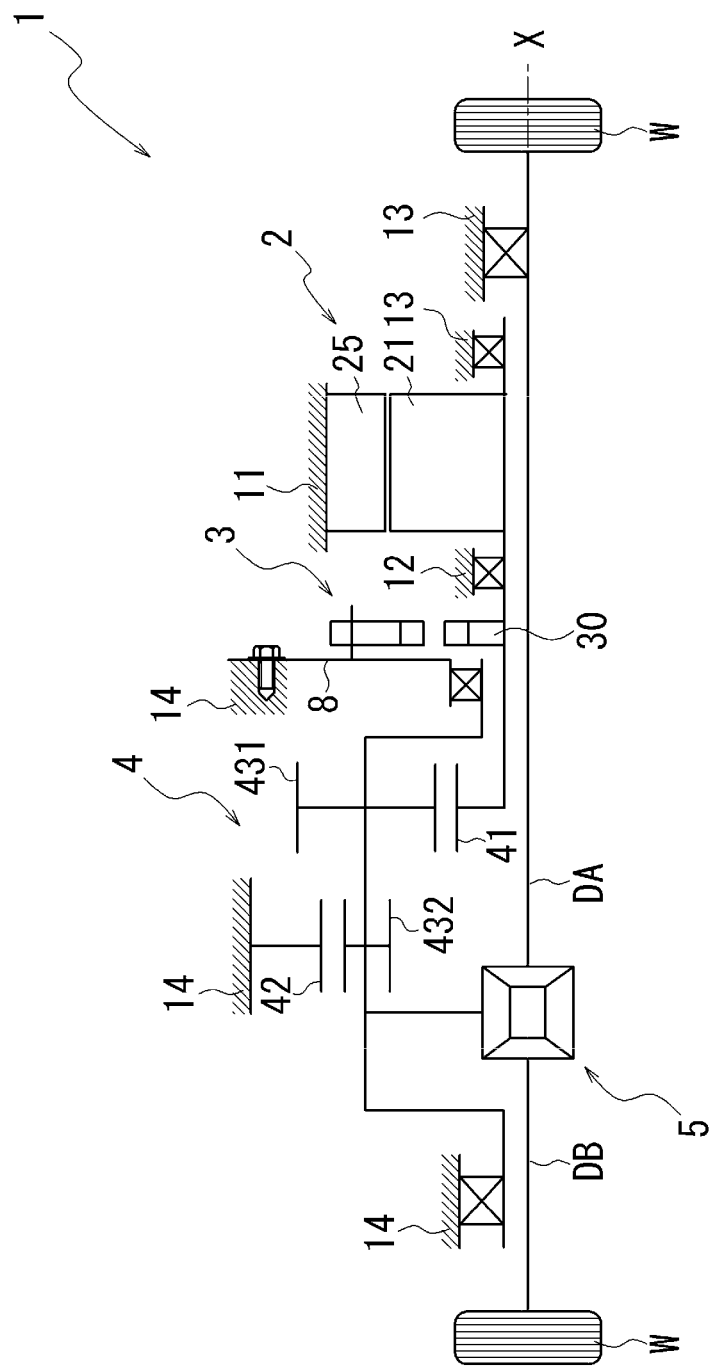
FIG. 1 is a skeleton diagram of a power transmission device.

FIG. 1 is a skeleton diagram for explaining a power transmission device 1 according to the present embodiment.

Figure 2:
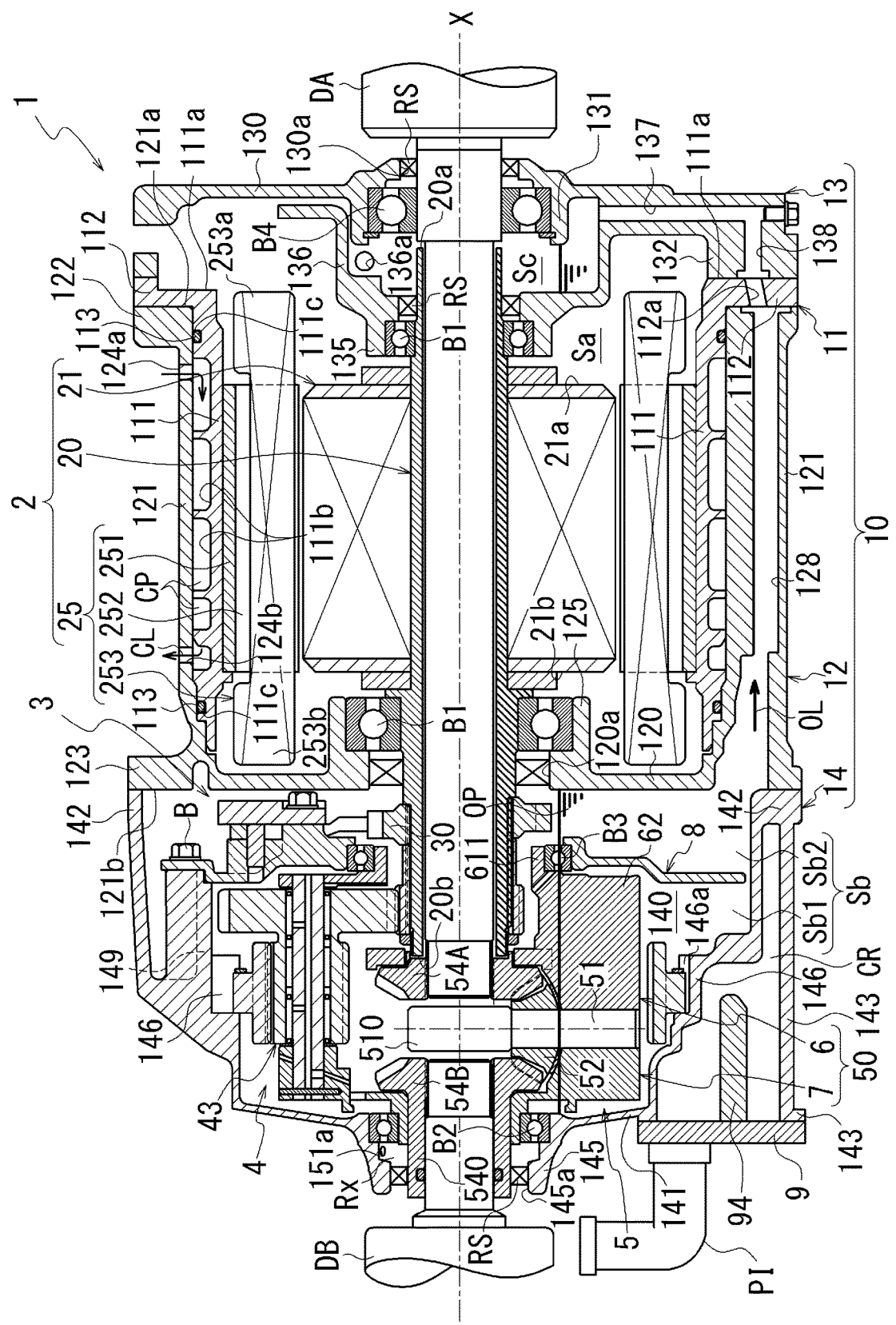
FIG. 2 is a cross section schematic diagram of the power transmission device.

FIG. 2 is a cross section schematic diagram for explaining the power transmission device 1 of the present embodiment.

Figure 3:
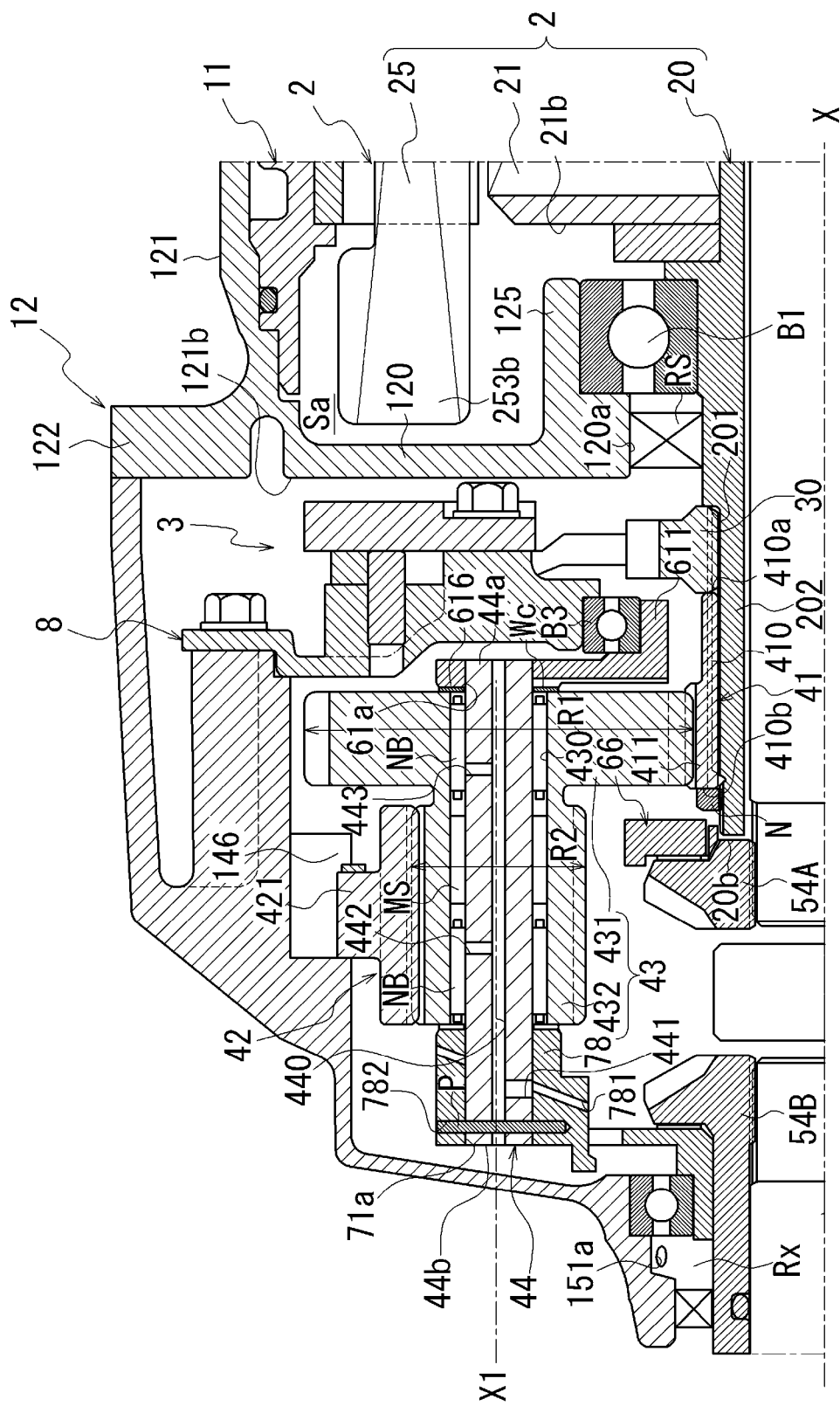
FIG. 3 is an enlarged view around a planetary reduction gear of the power transmission device.

FIG. 3 is an enlarged view around a planetary reduction gear 4 of the power transmission device 1.

Figure 4:
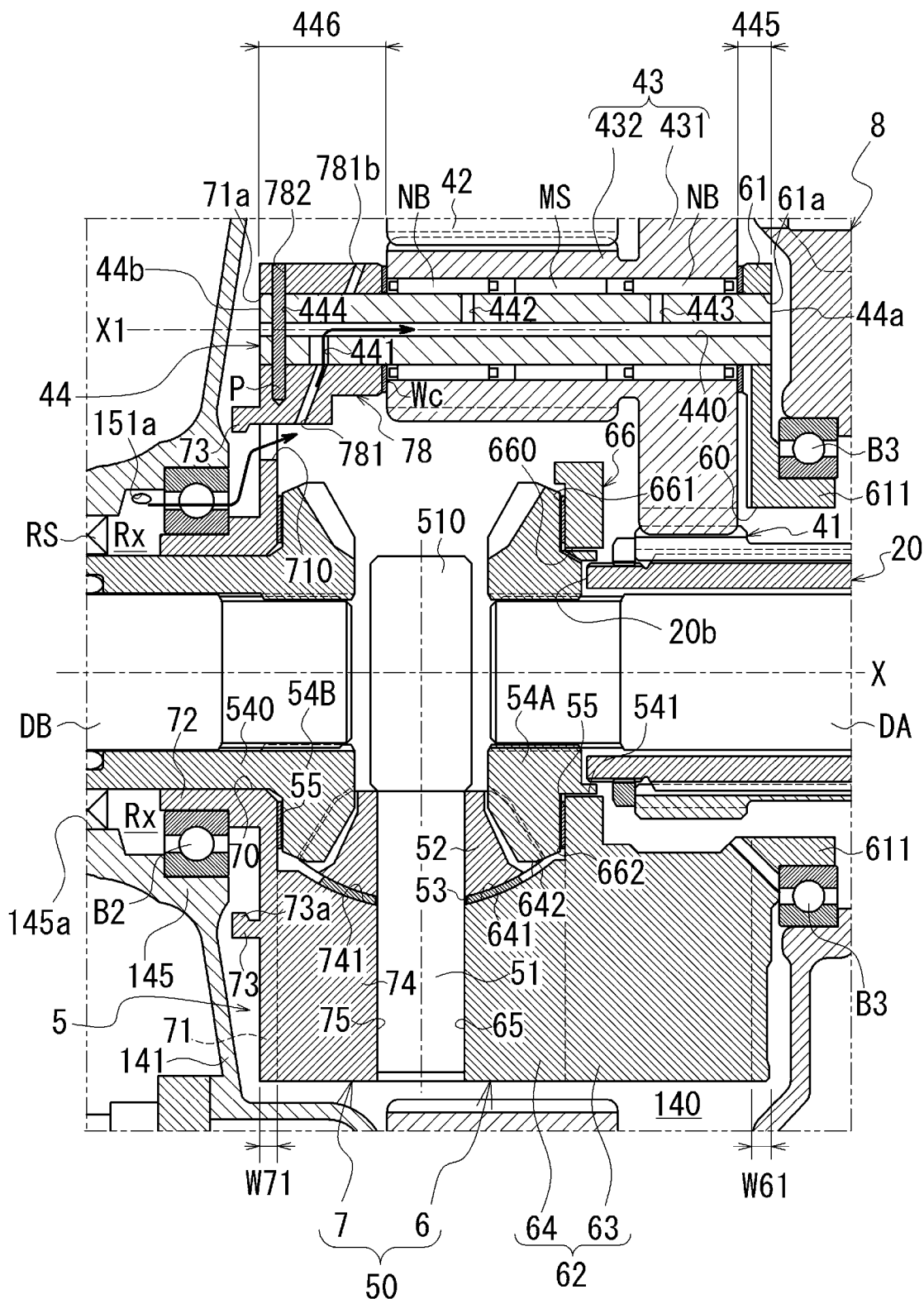
FIG. 4 is an enlarged view around a differential mechanism of the power transmission device.

FIG. 4 is an enlarged view around a differential mechanism 5 of the power transmission device 1.

As shown in FIG. 1, the power transmission device 1 has a motor 2, and the planetary reduction gear 4 (reduction mechanism) that reduces the output rotation of the motor 2 and inputs it to the differential mechanism 5. The power transmission device 1 also has drive shafts DA, DB, and a park lock mechanism 3.

In the power transmission device 1, the park lock mechanism 3, the planetary reduction gear 4, the differential mechanism 5, and the drive shafts DA, DB are provided along the transmission route of the output rotation of the motor 2 around the rotation axis X. The axis line of the drive shafts DA, DB is coaxial with the rotation axis X of the motor 2.

In the power transmission device 1, after being reduced by the planetary reduction gear 4 and inputted to the differential mechanism 5, the output rotation of the motor 2 is transmitted via the drive shafts DA, DB to left and right drive wheels W, W of a vehicle in which the power transmission device 1 is mounted.

Here, the planetary reduction gear 4 is connected downstream of the motor 2. The differential mechanism 5 is connected downstream of the planetary reduction gear 4. The drive shafts DA, DB are connected downstream of the differential mechanism 5.

As shown in FIG. 2, a body box 10 of the power transmission 1 has a first box 11 that houses the motor 2, and a second box 12 that is externally fitted on the first box 11. The body box 10 also has a third box 13 assembled on the first box 11, and a fourth box 14 assembled on the second box 12.

The first box 11 has a cylindrical support wall part 111, and a flange shaped junction part 112 provided on one end 111a of the support wall part 111.

In the first box 11, the support wall part 111 is provided facing along the rotation axis X of the motor 2. The motor 2 is housed on the inside of the support wall part 111.

The junction part 112 is provided facing orthogonal to the rotation axis X. The junction part 112 is formed with a larger outer diameter than the support wall part 111.

The second box 12 has a cylindrical peripheral wall part 121, a flange shaped junction part 122 provided on one end 121a of the peripheral wall part 121, and a flange shaped junction part 123 provided on another end 121b of the peripheral wall part 121.

The peripheral wall part 121 is formed with an inner diameter that can be externally fitted on the support wall part 111 of the first box 11.

The first box 11 and the second box 12 are assembled to each other by the peripheral wall part 121 of the second box 12 being externally fitted on the support wall part 111 of the first box 11.

The junction part 122 of the one end 121*a* side of the peripheral wall part 121 abuts the junction part 112 of the first box 11 from the rotation axis X direction. These junction parts 122, 112 are linked to each other by bolts (not illustrated).

In the first box 11, a plurality of recessed grooves 111*b* are provided on the outer circumference of the support wall part 111. The plurality of recessed grooves 111*b* are provided with a gap open in the rotation axis X direction. Each of the recessed grooves 111*b* is provided along the entire circumference in the circumferential direction around the rotation axis X.

The peripheral wall part 121 of the second box 12 is externally fitted on the support wall part 111 of the first box 11. The openings of the recessed grooves 111*b* are closed by the peripheral wall part 121. A plurality of cooling paths CP through which cooling liquid CL is circulated are formed between the support wall part 111 and the peripheral wall part 121.

An introduction port 124*a* for cooling liquid CL is provided at the junction part 122 side of the peripheral wall part 121. A discharge port 124*b* of the cooling liquid CL is provided at the junction part 123 side of the peripheral wall part 121. The introduction port 124*a* and the discharge port 124*b* are holes penetrating the peripheral wall part 121 in the radial direction of the rotation axis X. A pipe (not illustrated) through which the cooling liquid CL flows is connected to each of the introduction port 124*a* and the discharge port 124*b*. The cooling liquid CL circulates in a pipe (not illustrated) arranged in the vehicle interior using a water pump (not illustrated). The cooling liquid CL is introduced to the cooling path CP from the introduction port 124*a* and cools the motor 2. After cooling the motor 2, the cooling liquid CL is discharged from the discharge port 124*b*. The cooling liquid CL passes through a pipe (not illustrated) and is introduced into a cooling chamber CR described later that is provided in the fourth box 14.

At the outer circumference of the support wall part 111 of the first box 11, ring grooves 111*c*, 111*c* are formed at both sides of the region in which the recessed grooves 111*b* are provided. Seal rings 113, 113 are externally engaged and attached to the ring grooves 111*c*, 111*c*.

These seal rings 113 are press fitted on the inner circumference of the peripheral wall part 121 that is externally fitted on the support wall part 111, and seal the gap between the outer circumference of the support wall part 111 and the inner circumference of the peripheral wall part 121.

On the other end 121*b* of the second box 12, a wall part 120 extending to the inner diameter side is provided. The wall part 120 is provided facing orthogonal to the rotation axis X. An opening 120*a* in which the drive shaft DA is inserted is opened in the region intersecting the rotation axis X of the wall part 120.

In the wall part 120, a cylindrical motor support unit 125 that surrounds the opening 120*a* is provided on the motor 2 side (right side in the drawing) surface.

The motor support unit 125 is inserted inside a coil end 253*b* described later. The motor support unit 125 faces an end part 21*b* of a rotor core 21 with a gap open in the rotation axis X direction.

In the peripheral wall part 121 of the second box 12, in the lower region in the vertical line direction with the mounted state of the power transmission device 1 in the vehicle as reference, the thickness in the radial direction is thicker than the upper region.

In this region that is thick in the radial direction, an oil reservoir 128 is provided penetrating in the rotation axis X direction.

The oil reservoir 128 is connected via a communication hole 112*a* to an axial oil passage 138 provided in a junction part 132 of the third box 13. The communication hole 112*a* is provided in the junction part 112 of the first box 11.

The third box 13 has a wall part 130 that is orthogonal to the rotation axis X. The junction part 132 that forms a ring shape seen from the rotation axis X direction is provided on the outer circumference part of the wall part 130.

Seen from the first box 11, the third box 13 is positioned on the opposite side (right side in the drawing) from the differential mechanism 5. The junction part 132 of the third box 13 is joined to the junction part 112 of the first box 11 from the rotation axis X direction. The third box 13 and the first box 11 are linked to each other by bolts (not illustrated). In this state, in the first box 11, the opening on the junction part 122 side (right side in the drawing) of the support wall part 111 is blocked by the third box 13.

In the third box 13, an insertion hole 130*a* of the drive shaft DA is provided in the center of the wall part 130.

A lip seal RS is provided on the inner circumference of the insertion hole 130*a*. In the lip seal RS, a lip section (not illustrated) is in elastic contact with the outer circumference of the drive shaft DA. The gap between the inner circumference of the insertion hole 130*a* and the outer circumference of the drive shaft DA is sealed by the lip seal RS.

A peripheral wall part 131 that surrounds the insertion hole 130*a* is provided on the surface of the first box 11 side (left side in the drawing) in the wall part 130. The drive shaft DA is supported with a bearing B4 interposed on the inner circumference of the peripheral wall part 131.

Seen from the peripheral wall part 131, a motor support unit 135 is provided on the motor 2 side (left side in the drawing). The motor support unit 135 forms a tube shape that surrounds the rotation axis X with a gap open.

A cylindrical connecting wall 136 is connected to the outer circumference of the motor support unit 135. The connecting wall 136 is formed with a larger outer diameter than the peripheral wall part 131 of the wall part 130 side (right side in the drawing). The connecting wall 136 is provided facing along the rotation axis X, and extends in the direction separating from the motor 2. The connecting wall 136 connects the motor support unit 135 and the wall part 130 of the third box 13.

The motor support unit 135 is supported by the third box 13 with the connecting wall 136 interposed. One end 20*a* side of a motor shaft 20 penetrates the inside of the motor support unit 135 from the motor 2 side to the peripheral wall part 131 side.

A bearing B1 is supported on the inner circumference of the motor support unit 135. The outer circumference of the motor shaft 20 is supported by the motor support unit 135 with the bearing B1 interposed.

The lip seal RS is provided on the position adjacent to the bearing B1.

In the third box 13, an oil hole 136*a* described later is open at the inner circumference of the connecting wall 136. Oil OL from the oil hole 136*a* is made to flow into a space (internal space Sc) surrounded by the connecting wall 136.

The lip seal RS is provided to prevent the inflow of oil OL inside the connecting wall 136 to the motor 2 side.

The fourth box 14 has a peripheral wall part 141 that surrounds the outer circumference of the planetary reduction gear 4 and the differential mechanism 5, and a flange shaped junction part 142 provided on the end part of the second box 12 side in the peripheral wall part 141. The fourth box 14 functions as a box that houses the planetary reduction gear 4 and the differential mechanism 5 which are gear mechanisms.

The fourth box 14 is positioned at the differential mechanism 5 side (left side in the drawing) seen from the second box 12. The junction part 142 of the fourth box 14 is joined from the rotation axis X direction to the junction part 123 of the second box 12. The fourth box 14 and the second box 12 are linked to each other by bolts (not illustrated).

Inside the body box 10 of the power transmission device 1, a motor chamber Sa that houses the motor 2 and a gear chamber Sb (first chamber) that houses the planetary reduction gear 4 and the differential mechanism 5 are formed.

The motor chamber Sa is formed between the wall part 120 of the second box 12 and the wall part 130 of the third box 13 on the inside of the first box 11.

The gear chamber Sb is formed between the wall part 120 of the second box 12 and the peripheral wall part 141 of the fourth box 14 on the inner diameter side of the fourth box 14.

A plate member 8 is provided on the inside of the gear chamber Sb.

The plate member 8 is fixed by the bolt B to the fourth box 14.

In the plate member 8, the gear chamber Sb is partitioned into a first gear chamber Sb1 that houses the planetary reduction gear 4 and the differential mechanism 5, and a second gear chamber Sb2 that houses the park lock mechanism 3.

The second gear chamber Sb2 is positioned between the first gear chamber Sb1 and the motor chamber Sa in the rotation axis X direction.

The motor 2 has the cylindrical motor shaft 20, the cylindrical rotor core 21 externally fitted on the motor shaft 20, and a stator core 25 that surrounds the outer circumference of the rotor core 21 with a gap open.

In the motor shaft 20, bearings B1, B1 are externally fitted and fixed at both sides of the rotor core 21. The bearing B1 positioned at one end 20a side (right side in the drawing) of the motor shaft 20 seen from the rotor core 21 is supported on the inner circumference of the motor support unit 135 of the third box 13. The bearing B1 positioned at the other end 20b side is supported on the inner circumference of the cylindrical motor support unit 125 of the second box 12.

The motor support units 135, 125 are arranged facing with a gap open in the rotation axis X direction on the one end part 21a and the other end part 21b of the rotor core 21 on the inner diameter side of coil ends 253a, 253b described later.

The rotor core 21 is formed by laminating a plurality of silicon steel sheets. Each of the silicon steel sheets is externally fitted on the motor shaft 20 in a state where relative rotation with the motor shaft 20 is regulated.

Seen from the rotation axis X direction of the motor shaft 20, the silicon steel sheet has a ring shape. At the outer circumference side of the silicon steel sheet, N pole and S pole magnets (not illustrated) are provided alternately in the circumferential direction around the rotation axis X.

The stator core 25 surrounding the outer circumference of the rotor core 21 is formed by laminating a plurality of electromagnetic steel sheets. The stator core 25 is fixed to the inner circumference of the cylindrical support wall part 111 of the first box 11.

Each of the electromagnetic steel sheets has a ring-shaped yoke part 251 fixed to the inner circumference of the support wall part 111, and a teeth part 252 projecting to the rotor core 21 side from the inner circumference of the yoke part 251.

With the present embodiment, the stator core 25 having a configuration in which a winding 253 is distributed and wound across a plurality of teeth parts 252 is adopted. The stator core 25 has a longer length in the rotation axis X direction than the rotor core 21 by the amount of the coil ends 253a, 253b projecting in the rotation axis X direction.

It is also possible to adopt the stator core of a configuration in which the windings are concentrically wound on each of the plurality of teeth parts 252 projecting to the rotor core 21 side.

The opening 120a is provided in the wall part 120 (motor support unit 125) of the second box 12. The other end 20b side of the motor shaft 20 is positioned inside the fourth box 14, penetrating the opening 120a at the differential mechanism 5 side (left side in the drawing).

The other end 20b of the motor shaft 20 faces a side gear 54A described later with a gap open in the rotation axis X direction on the inside of the fourth box 14.

As shown in FIG. 3, in the motor shaft 20, a step 201 is provided in a region positioned inside the fourth box 14. The step 201 is positioned in the vicinity of the motor support unit 125. The lip seal RS supported on the inner circumference of the motor support unit 125 is abutting the outer circumference of the region between the step 201 and the bearing B1.

The lip seal RS is partitioned into the motor chamber Sa that houses the motor 2 and the gear chamber Sb inside the fourth box 14.

The oil OL for lubricating the planetary reduction gear 4 and the differential mechanism 5 is sealed at the inner diameter side of the fourth box 14 (see FIG. 2).

The lip seal RS is provided to prevent inflow of the oil OL to the motor chamber Sa.

As shown in FIG. 3, in the motor shaft 20, the region from the step 201 to the vicinity of the other end 20b is a fitted part 202 with a spline provided on the outer circumference.

The parking gear 30 and a sun gear 41 are spline fitted on the outer circumference of the fitted part 202.

In the parking gear 30, one side surface of the parking gear 30 abuts the step 201 (right side in the drawing). One end 410a of a cylindrical base 410 of the sun gear 41 abuts the other side surface of the parking gear 30 (left side in the drawing).

A nut N screwed onto the other end 20b of the motor shaft 20 is press fitted from the rotation axis X direction on the other end 410b of the base 410.

The sun gear 41 and the parking gear 30 are provided in a state sandwiched between the nut N and the step 201, without being able to rotate relatively to the motor shaft 20.

The sun gear 41 has teeth 411 on the outer circumference of the other end 20b side of the motor shaft 20. A large diameter gear part 431 of a stepped pinion gear 43 engages with the outer circumference of the teeth 411.

The stepped pinion gear 43 has the large diameter gear part 431 that engages with the sun gear 41, and a small diameter gear part 432 with a smaller diameter than the large diameter gear part 431.

The stepped pinion gear 43 is a gear component in which the large diameter gear part 431 and the small diameter gear part 432 are provided integrally aligned in an axis line X1 direction parallel to the rotation axis X.

The large diameter gear part 431 is formed with an outer diameter R1 greater than an outer diameter R2 of the small diameter gear part 432.

The stepped pinion gear 43 is provided facing along the axis line X1. In this state, the large diameter gear part 431 is positioned at the motor 2 side (right side in the drawing).

The outer circumference of the small diameter gear part 432 is engaged with the inner circumference of a ring gear 42. The ring gear 42 forms a ring shape that surrounds the rotation axis X with a gap open. A plurality of engagement teeth 421 projecting radially outward are provided on the outer circumference of the ring gear 42. The plurality of engagement teeth 421 are provided at intervals to each other in the circumferential direction around the rotation axis X.

In the ring gear 42, the engagement teeth 421 provided on the outer circumference are spline fitted to teeth 146a provided on a support wall part 146 of the fourth box 14. In the ring gear 42, rotation around the rotation axis X is regulated.

The stepped pinion gear 43 has a through hole 430 penetrating the inner diameter side of the large diameter gear part 431 and the small diameter gear part 432 in the axis line X1 direction.

The stepped pinion gear 43 is supported to be able to rotate on the outer circumference of a pinion shaft 44 penetrating the through hole 430 with the needle bearings NB, NB interposed.

On the outer circumference of the pinion shaft 44, a middle spacer MS is interposed between the needle bearing NB that supports the inner circumference of the large diameter gear part 431 and the needle bearing NB that supports the inner circumference of the small diameter gear part 432.

As shown in FIG. 4, a shaft-internal oil passage 440 is provided on the inside of the pinion shaft 44. The shaft-internal oil passage 440 penetrates from one end 44a of the pinion shaft 44 to another end 44b along the axis line X1.

Oil holes 442, 443 that communicate between the shaft-internal oil passage 440 and the outer circumference of the pinion shaft 44 are provided on the pinion shaft 44.

The oil hole 443 opens in the region in which the needle bearing NB that supports the inner circumference of the large diameter gear part 431 is provided.

The oil hole 442 opens in the region in which the needle bearing NB that supports the inner circumference of the small diameter gear part 432 is provided. In the pinion shaft 44, the oil holes 443, 442 open inside the region in which the stepped pinion gear 43 is externally fitted.

Furthermore, an introduction path 441 for introducing the oil OL into the shaft-internal oil passage 440 is provided in the pinion shaft 44.

In the outer circumference of the pinion shaft 44, the introduction path 441 opens in the region positioned inside a support hole 71a of a second case unit 7 described later. The introduction path 441 communicates between the shaft-internal oil passage 440 and the outer circumference of the pinion shaft 44.

A case-internal oil passage 781 is opened on the inner circumference of the support hole 71a. The case-internal oil passage 781 communicates between the outer circumference of a guide unit 78 projecting from a base 71 of the second case unit 7 and the support hole 71a.

In the cross section view along the axis line X1, the case-internal oil passage 781 is inclined with respect to the axis line X1. The case-internal oil passage 781 is inclined facing toward a slit 710 provided in the base 71 as it faces the rotation axis X side.

The oil OL scooped up by a differential case 50 described later flows into the case-internal oil passage 781. Also, the oil OL that moves to the outer diameter side by centrifugal force due to rotation of the differential case 50 also flows into the case-internal oil passage 781.

The oil OL that flows into the introduction path 441 from the case-internal oil passage 781 flows into the shaft-internal oil passage 440 of the pinion shaft 44. The oil OL that flows into the shaft-internal oil passage 440 is discharged radially outward from the oil holes 442, 443. The oil OL discharged from the oil holes 442, 443 lubricates the needle bearing NB externally fitted on the pinion shaft 44.

In the pinion shaft 44, a through hole 444 is provided more to the other end 44b side than the region in which the introduction path 441 is provided. The through hole 444 penetrates the pinion shaft 44 in the diameter line direction.

The pinion shaft 44 is provided so that the through hole 444 and an insertion hole 782 of the second case unit 7 described later are in phase around the axis line X1. A positioning pin P inserted in the insertion hole 782 penetrates the through hole 444 of the pinion shaft 44. As a result, the pinion shaft 44 is supported on the second case unit 7 side in a state with rotation around the axis line X1 regulated.

As shown in FIG. 4, on the one end 44a side in the lengthwise direction of the pinion shaft 44, a region projecting from the stepped pinion gear 43 is a first shaft part 445. The first shaft part 445 is supported by a support hole 61a provided in a first case unit 6 of the differential case 50.

At the other end 44b side in the lengthwise direction of the pinion shaft 44, the region projecting from the stepped pinion gear 43 is a second shaft part 446. The second shaft part 446 is supported by the support hole 71a provided in the second case unit 7 of the differential case 50.

Here, the first shaft part 445 means a region of the one end 44a side in which the stepped pinion gear 43 is not externally fitted in the pinion shaft 44. The second shaft part 446 means a region of the other end 44b side in which the stepped pinion gear 43 is not externally fitted in the pinion shaft 44.

In the pinion shaft 44, the length of the axis line X1 direction is longer for the second shaft part 446 than the first shaft part 445.

Following, the main configuration of the differential mechanism 5 is explained.

Figure 5:
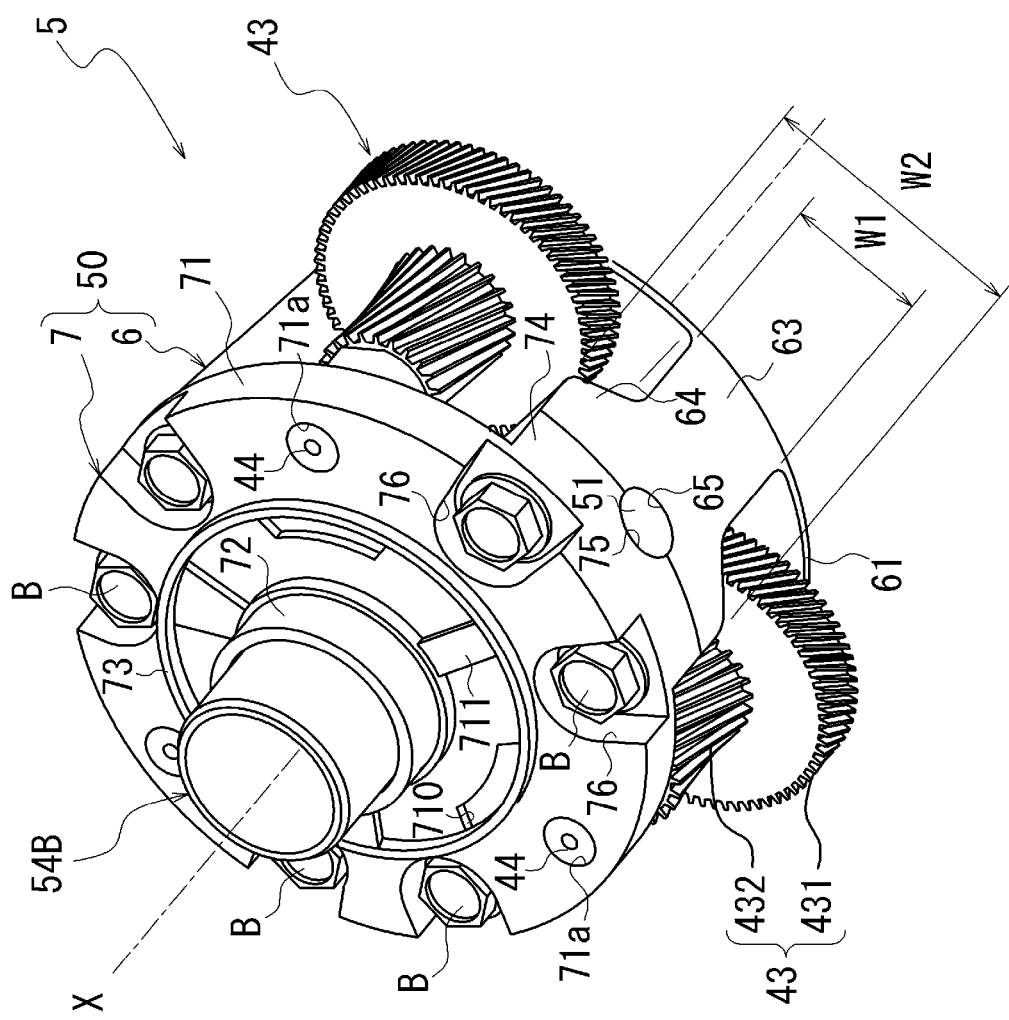
FIG. 5 is a perspective view of the differential mechanism of the power transmission device.

FIG. 5 is a perspective view around the differential case 50 of the differential mechanism 5.

Figure 6:
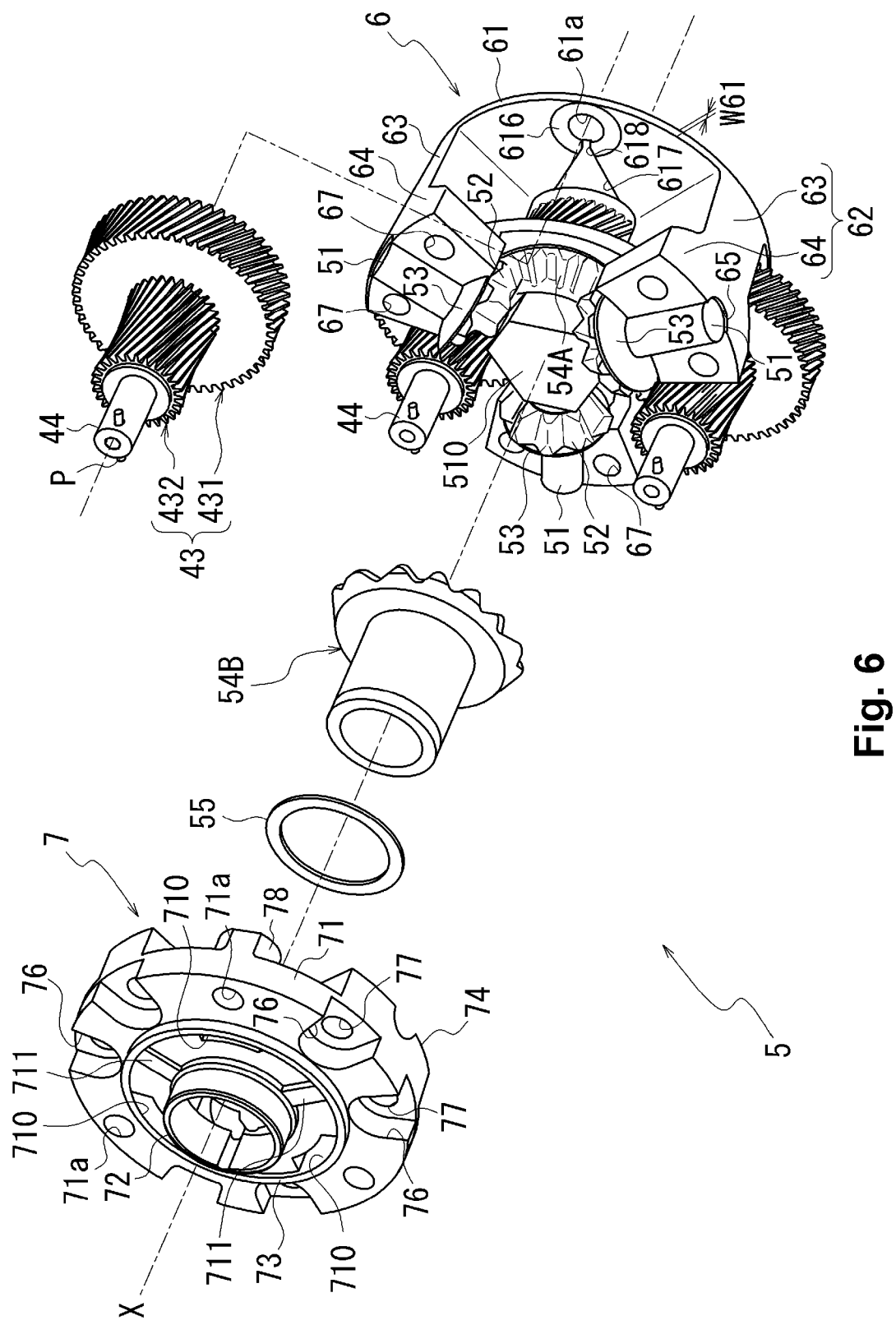
FIG. 6 is an exploded perspective view of the differential mechanism of the power transmission device.

FIG. 6 is an exploded perspective view around the differential case 50 of the differential mechanism 5.

As shown in FIG. 4 to FIG. 6, the differential case 50 of the differential mechanism 5 is formed by assembling the first case unit 6 and the second case unit 7 in the rotation axis X direction. In the present embodiment, the first case unit 6 and the second case unit 7 of the differential case 50 have a function as carriers that support the pinion shaft 44 of the planetary reduction gear 4.

As shown in FIG. 6, pinion mate shafts 51 and pinion mate gears 52 are arranged between the first case unit 6 and the second case unit 7 of the differential case 50. Three pinion mate gears 52 and three pinion mate shafts 51 are provided.

The pinion mate shafts 51 are provided at equal intervals in the circumferential direction around the rotation axis X.

The end part of the inner diameter side of each pinion mate shaft 51 is linked to a common linking part 510.

One pinion mate gear 52 each is externally fitted on the pinion mate shafts 51. Each pinion mate gear 52 is in contact with the linking part 510 from the radial outward side of the rotation axis X.

Each of the pinion mate gears 52 in this state is supported to be rotatable on the pinion mate shaft 51.

As shown in FIG. 4, a spherical washer 53 is externally fitted on the pinion mate shaft 51. The spherical washer 53 is in contact with the spherical outer circumference of the pinion mate gear 52.

In the differential case 50, the side gear 54A is positioned at one side of the linking part 510 in the rotation axis X direction, and a side gear 54B is positioned at the other side. The side gear 54A is supported to be rotatable on the first case unit 6. The side gear 54B is supported to be rotatable on the second case unit 7.

The side gear 54A is engaged to the three pinion mate gears 52 from one side in the rotation axis X direction. The side gear 54B engages with the three pinion mate gears 52 from the other side in the rotation axis X direction.

As shown in FIG. 6, the first case unit 6 has a ring-shaped base 61. The base 61 is a plate-shaped member having a thickness W61 in the rotation axis X direction.

As shown in FIG. 4, an opening 60 is provided in the center of the base 61. A cylinder wall part 611 that surrounds the opening 60 is provided on the surface on the side opposite to the second case unit 7 (right side in the drawing) in the base 61. The outer circumference of the cylinder wall part 611 is supported by the plate member 8 with a bearing B3 interposed.

As shown in FIG. 6, three linking beams 62 extending to the second case unit 7 side are provided on the surface of the second case unit 7 side in the base 61.

The linking beams 62 are provided at equal intervals in the circumferential direction around the rotation axis X. The linking beams 62 have a base 63 orthogonal to the base 61 and a linking part 64 that is wider than the base 63.

As shown in FIG. 4, a support groove 65 for supporting the pinion mate shaft 51 is provided on the tip surface of the linking part 64.

An arc part 641 is formed in a shape following the outer circumference of the pinion mate gear 52 on the inner diameter side (rotation axis X side) of the linking part 64.

The outer circumference of the pinion mate gear 52 is supported by the arc part 641 with the spherical washer 53 interposed.

A gear support part 66 is connected at the boundary of the base 63 and the linking part 64 of the linking beam 62. The gear support part 66 is provided facing orthogonal to the rotation axis X. A through hole 660 is formed at the center of the gear support part 66.

A recess 661 surrounding the through hole 660 is provided on the surface of the side opposite to the base 61 (left side in the drawing) of the gear support part 66. In the recess 661, a ring-shaped washer 55 that supports the back surface of the side gear 54A is housed.

A cylindrical cylinder wall part 541 is provided on the back surface of the side gear 54A, and the washer 55 is externally fitted on the cylinder wall part 541. [円筒状の筒壁部５４１ 設けられている: が which appeared in a previous version seems to have accidentally been deleted; translator].

As shown in FIG. 6, the linking beams 62, 62 of the base 61 are arranged at intervals in the circumferential direction around the rotation axis X. The support hole 61a of the pinion shaft 44 is open at the region between the linking beams 62, 62.

A boss part 616 surrounding the support hole 61a is provided on the base 61. As shown in FIG. 3, a washer We externally fitted on the pinion shaft 44 is in contact with the boss part 616 from the rotation axis X direction.

As shown in FIG. 6, an oil groove 617 is provided in the range from the center opening 60 to the boss part 616 of the base 61. The oil groove 617 is formed in a tapered shape in which the circumferential direction width around the rotation axis X becomes narrower as it approaches the boss part 616. The oil groove 617 is connected to an oil groove 618 provided on the boss part 616.

In the linking part 64, bolt holes 67, 67 are provided at both sides of the support groove 65.

A linking part 74 of the second case unit 7 side is joined from the rotation axis X direction to the linking part 64 of the first case unit 6. Bolts B (see FIG. 5) that penetrate the linking part 74 of the second case unit 7 side are screwed into bolt holes 67, 67. The first case unit 6 and the second case unit 7 are joined to each other by the bolts B.

As shown in FIG. 6, the second case unit 7 has the ring-shaped base 71.

As shown in FIG. 4, the base 71 is a plate-shaped member having a thickness W71 in the rotation axis X direction.

A through hole 70 that penetrates the base 71 in the thickness direction is provided at the center of the base 71.

A cylinder wall part 72 that surrounds the through hole 70 and a peripheral wall part 73 that surrounds the cylinder wall part 72 with a gap open are provided at the surface on the side opposite to the first case unit 6 (left side in the drawing) in the base 71.

A projection 73a that projects to the rotation axis X side is provided at the tip of the peripheral wall part 73. The projection 73a is provided across the entire circumference in the circumferential direction around the rotation axis X.

As shown in FIG. 6, three support holes 71a of the pinion shaft 44 are open at the outer diameter side of the peripheral wall part 73. The three support holes 71a are provided at intervals to each other in the circumferential direction around the rotation axis X.

Three slits 710 penetrating the base 71 in the thickness direction are provided on the inner diameter side of peripheral wall part 73.

Seen from the rotation axis X direction, the slits 710 form an arc shape along the inner circumference of the peripheral wall part 73. The slits 710 are formed in a prescribed angle range in the circumferential direction around the rotation axis X.

The slits 710 in the second case unit 7 are provided at intervals to each other in the circumferential direction around the rotation axis X. Each of the slits 710 is provided crossing the inner diameter side of the support hole 71a in the circumferential direction around the rotation axis X.

Three projecting walls 711 projecting in the direction separating from the first case unit 6 are provided between adjacent slits 710, 710 in the circumferential direction around the rotation axis X. The projecting walls 711 extend in a straight line along the radial direction of the rotation axis X. The projecting walls 711 are provided straddling the peripheral wall part 73 of the outer diameter side and the cylinder wall part 72 of the inner diameter side.

Three projecting walls 711 are provided at intervals to each other in the circumferential direction around the rotation axis X. The projecting walls 711 are provided with a phase shift of approximately 45 degrees in the circumferential direction around the rotation axis X with respect to the slits 710.

Bolt housing parts 76, 76 recessed at the first case unit 6 side are provided between support holes 71*a*, 71*a* adjacent in the circumferential direction around the rotation axis X at the outer diameter side of the peripheral wall part 73.

Bolt insertion holes 77 open at the inside of the bolt housing parts 76. The insertion holes 77 penetrate the base 71 in the thickness direction (rotation axis X direction).

As shown in FIG. 4, the linking part 74 projecting to the first case unit 6 side is provided at the surface of the first case unit 6 side (right side in the drawing) in the base 71.

The same number of linking parts 74 are provided as the linking beams 62 on the first case unit 6 side.

A support groove 75 for supporting the pinion mate shaft 51 is provided on the tip surface of the linking part 74.

An arc part 741 is provided along the outer circumference of the pinion mate gear 52 on the inner diameter side (rotation axis X side) of the linking part 74.

In the arc part 741, the outer circumference of the pinion mate gear 52 is supported with the spherical washer 53 interposed.

In the second case unit 7, the ring-shaped washer 55 that supports the back surface of the side gear 54B is placed on the front surface 71*b* of the base 71. A cylindrical cylinder wall part 540 is provided on the back surface of the side gear 54B. The washer 55 is externally fitted on the cylinder wall part 540.

The guide unit 78 is provided on the base 71 of the second case unit 7. The guide unit 78 projects to the first case unit 6 side (right side in the drawing). The same number of guide units 78 are provided as the boss parts 616 of the first case unit 6 (see FIG. 6).

As shown in FIG. 4, in the cross section view along the axis line X1, the pinion shaft 44 is inserted from the first case unit 6 side in the support hole 71*a* of the guide unit 78. The pinion shaft 44 is positioned by the positioning pin P in a state with the rotation around the axis line X1 regulated.

In this state, the small diameter gear part 432 of the stepped pinion gear 43 externally fitted on the pinion shaft 44 abuts the guide unit 78 from the axis line X1 direction with the washer We sandwiched between.

In the differential case 50, a bearing B2 is externally fitted on the cylinder wall part 72 of the second case unit 7. The bearing B2 that is externally fitted on the cylinder wall part 72 is held by a support unit 145 of the fourth box 14. The cylinder wall part 72 of the differential case 50 is supported to be rotatable with the fourth box 14 with the bearing B2 interposed.

The drive shaft DB that penetrates an opening 145*a* of the fourth box 14 is inserted from the rotation axis X direction in the support unit 145. The drive shaft DB is supported to be rotatable with the support unit 145.

The lip seal RS is fixed to the inner circumference of the opening 145*a*. The lip section (not illustrated) of the lip seal RS is elastically in contact with the outer circumference of the cylinder wall part 540 of the side gear 54B externally fitted on the drive shaft DB.

As a result, the gap between the outer circumference of the cylinder wall part 540 of the side gear 54B and the inner circumference of the opening 145*a* is sealed.

As shown in FIG. 2, the first case unit 6 of the differential case 50 is supported by the plate member 8 with the bearing B3 that is externally fitted on the cylinder wall part 611 interposed.

The drive shaft DA that penetrates the insertion hole 130*a* of the third box 13 is inserted from the rotation axis X direction inside the first case unit 6.

The drive shaft DA is provided crossing the motor shaft 20 of the motor 2 and the inner diameter side of the sun gear 41 of the planetary reduction gear 4 in the rotation axis X direction.

As shown in FIG. 4, in the interior of the differential case 50, side gears 54A, 54B are spline fitted at the outer circumference of the tip end part of the drive shafts DA, DB. The side gears 54A, 54B and drive shafts DA, DB are linked to be able to rotate integrally around the rotation axis X.

In this state, the side gears 54A, 54B are arranged facing with a gap open in the rotation axis X direction. The linking part 510 of the pinion mate shaft 51 is positioned between the side gears 54A, 54B.

In the present embodiment, the three pinion mate shafts 51 extend radially outside from the linking part 510. A pinion mate gear 52 is supported on each of the pinion mate shafts 51. The pinion mate gears 52 are assembled in a state with the teeth mutually engaged on the side gear 54A positioned at one side in the rotation axis X direction and the side gear 54B positioned at the other side.

Shown by the bold line in FIG. 2, an oil retaining part OP that retains oil OL for lubrication is formed at the lower part of the gear chamber Sb of the fourth box 14. The bottom side of the differential case 50 is positioned within the oil retaining part OP.

In the present embodiment, when the linking beam 62 is positioned at the bottommost side, the oil OL is retained up to the height at which the linking beam 62 is positioned within the oil retaining part OP.

When the output rotation of the motor 2 is transmitted, the oil OL of the oil retaining part OP is scooped up by the differential case 50 that rotates around the rotation axis X.

FIG. 7 to FIG. 12 are drawings for explaining the oil catch unit 15.

Figure 7:
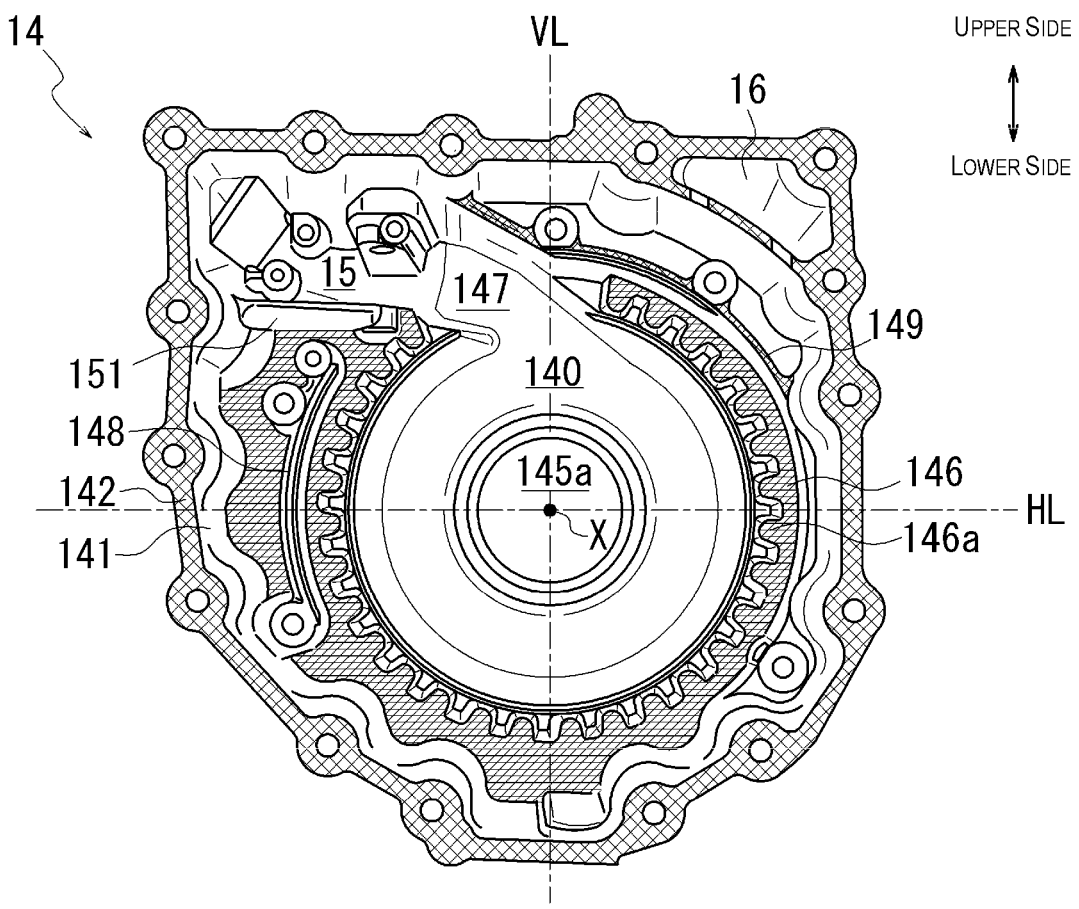
FIG. 7 is a drawing for explaining an oil catch unit.

FIG. 7 is a plan view of the fourth box 14 seen from the third box 13 side.

Figure 8:
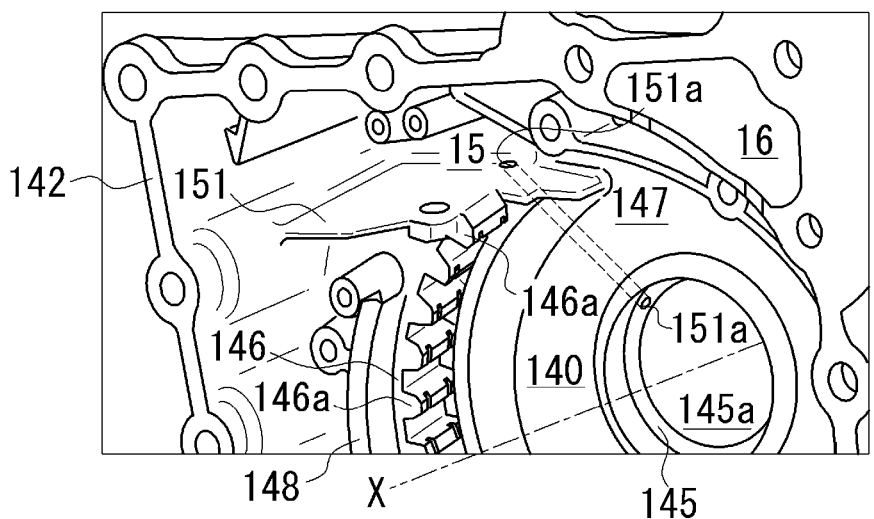
FIG. 8 is a drawing for explaining the oil catch unit.
Figure 17:
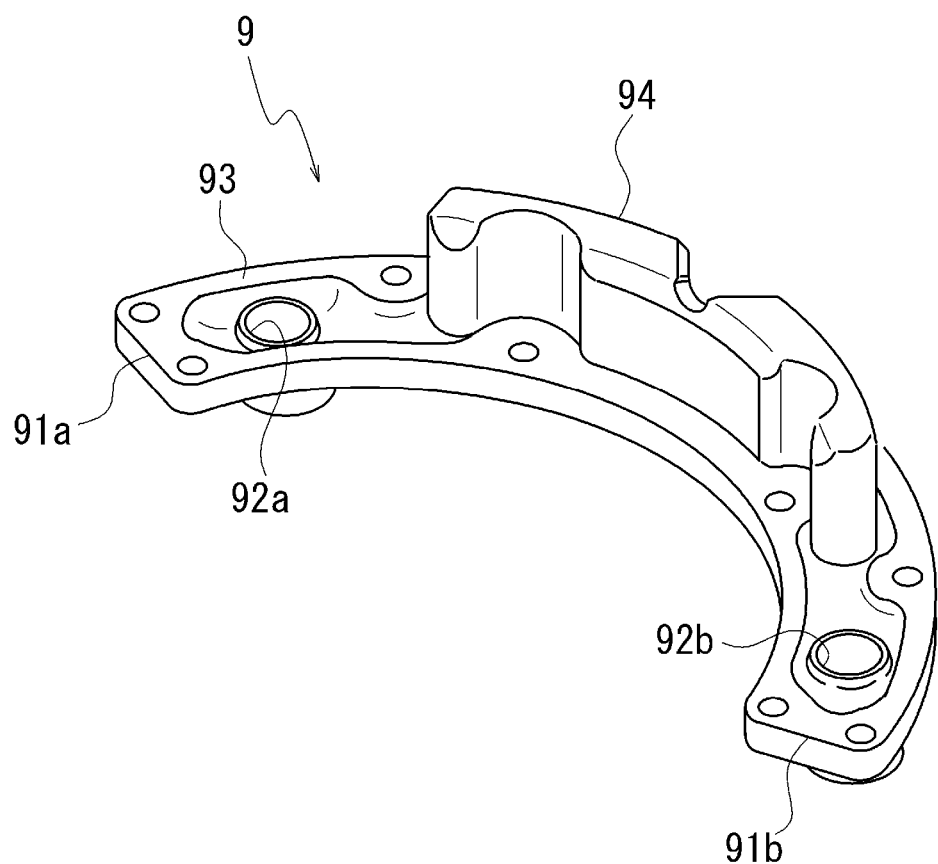
FIG. 17 is a drawing showing the configuration of the lid part.

FIG. 8 is a perspective view of the oil catch unit 15 shown in FIG. 17 seen from diagonally above.

Figure 9:
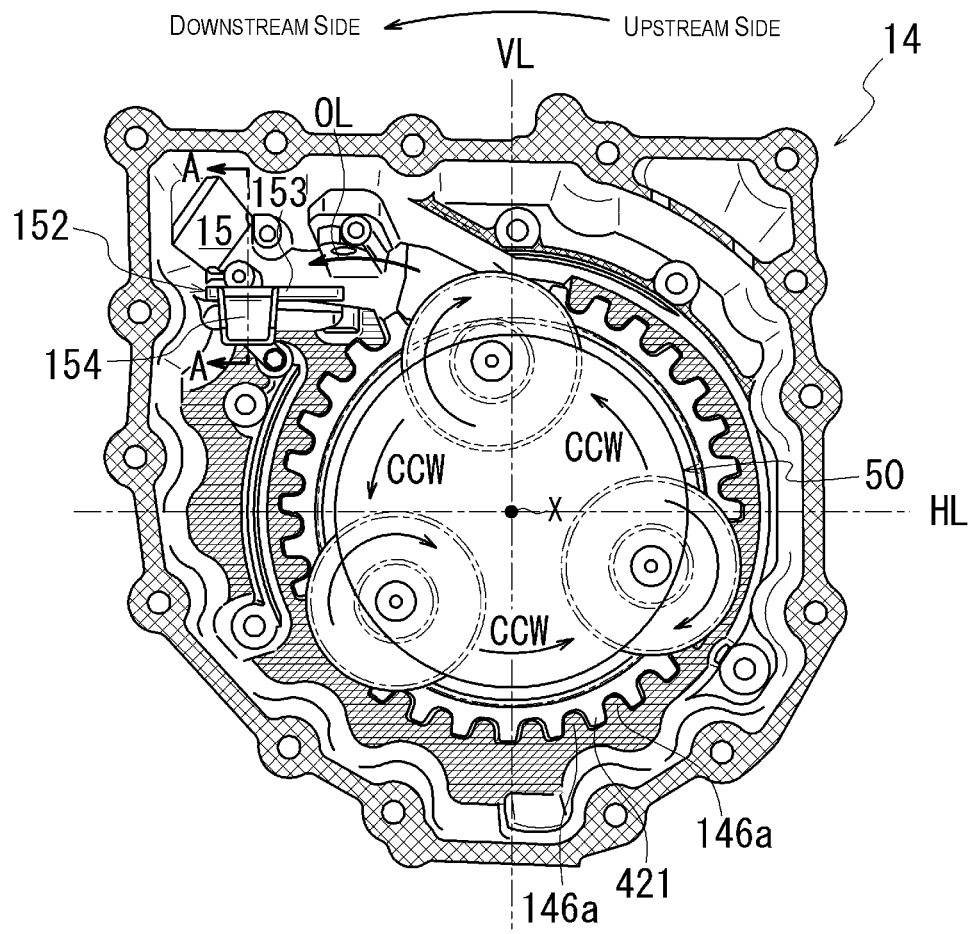
FIG. 9 is a drawing for explaining the oil catch unit.

FIG. 9 is a plan view of the fourth box 14 seen from the third box 13 side, and is a drawing showing the state with the differential case 50 arranged.

Figure 10:
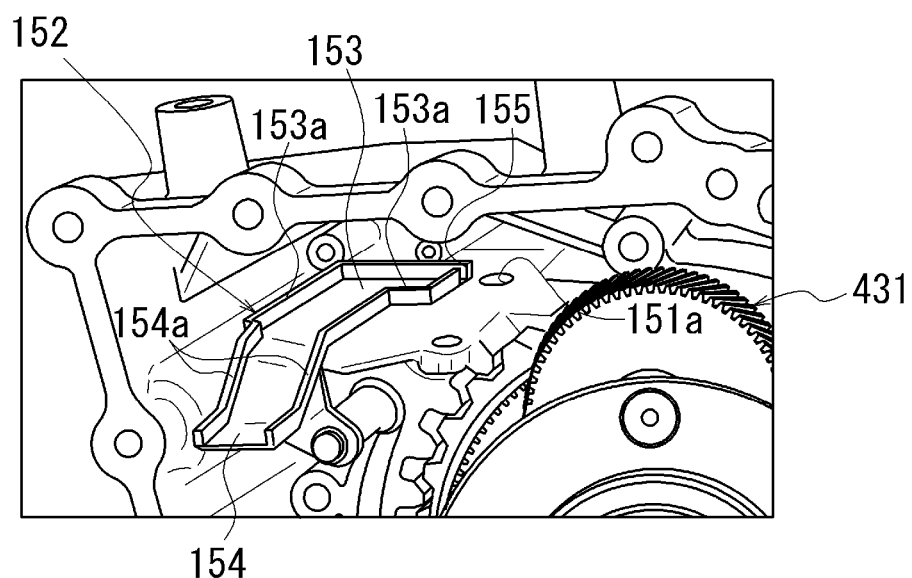
FIG. 10 is a drawing for explaining the oil catch unit.

FIG. 10 is a perspective view of the oil catch unit 15 shown in FIG. 9 seen from diagonally above.

Figure 11:
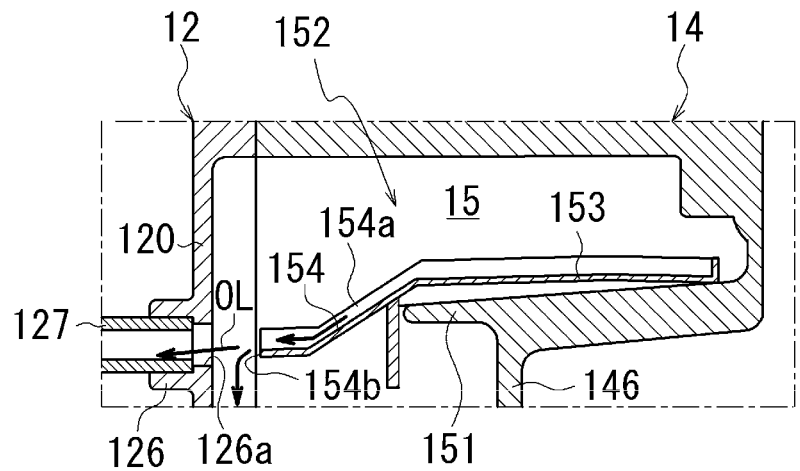
FIG. 11 is a drawing for explaining the oil catch unit.

FIG. 11 is a schematic diagram of the A-A cross section in FIG. 9.

Figure 12:
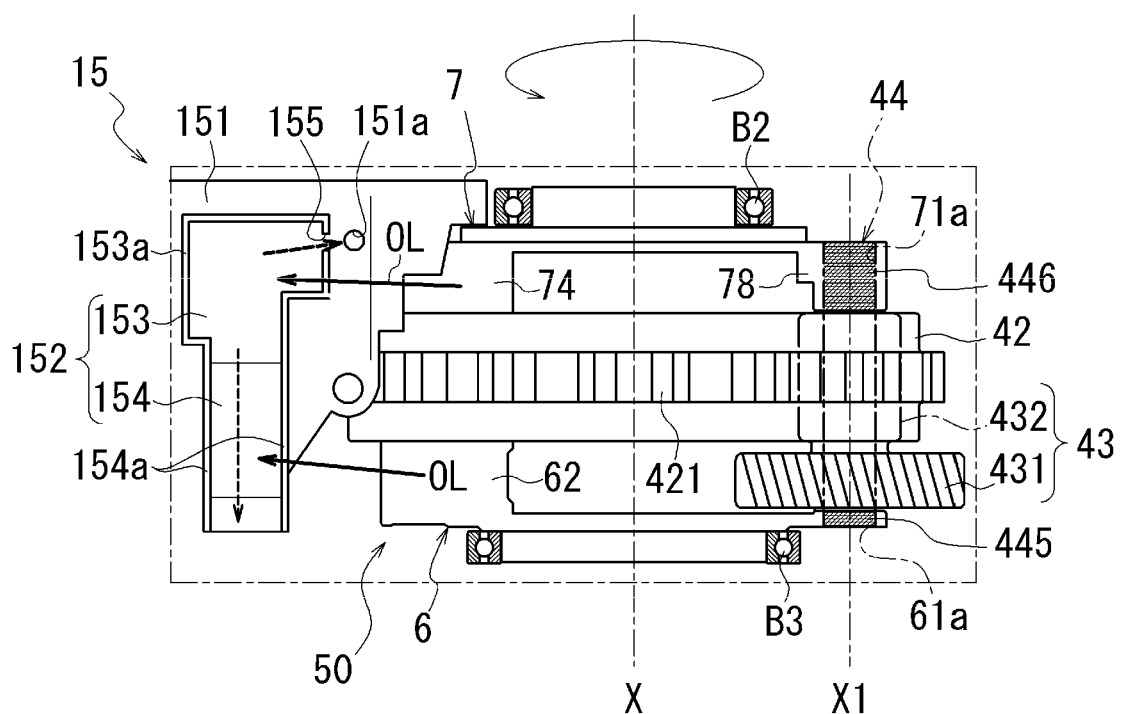
FIG. 12 is a drawing for explaining the oil catch unit.

FIG. 12 is a schematic diagram for explaining the positional relationship between the oil catch unit 15 and the differential case 50 (first case unit 6, second case unit 7) when the power transmission device 1 is seen from above.

In FIG. 7 and FIG. 9, to make the position of the junction part 142 of the fourth box 14 and the support wall part 146 clear, these are shown marked by cross hatching.

The vertical line VL in FIG. 7 and FIG. 9 is a vertical line VL with the installation state of the power transmission device 1 in the vehicle as reference. Seen from the rotation axis X direction, the vertical line VL is orthogonal to the rotation axis X. Also, the horizontal line HL is the horizontal line HL with the installation state of the power transmission device 1 in the vehicle as reference. Seen from the rotation axis X direction, the horizontal line HL is orthogonal to the rotation axis X and the vertical line VL.

As shown in FIG. 7, the support wall part 146 surrounding the center opening 145*a* with a gap open is provided in the fourth box 14 seen from the rotation axis X direction. The inside (rotation axis X) side of the support wall part 146 is a housing unit 140 of the differential case 50.

A space of the oil catch unit 15 and a space of a breather chamber 16 are formed on the top part inside the fourth box 14.

In the support wall part 146 of the fourth box 14, a communication port 147 that communicates between the oil catch unit 15 and the housing unit 140 of the differential case 50 is provided in the region intersecting a vertical line VL.

The oil catch unit 15 and the breather chamber 16 are respectively positioned at one side (left side in the drawing) and the other side (right side in the drawing) sandwiching the vertical line VL that is orthogonal to the rotation axis X.

The oil catch unit 15 is arranged at a position offset from the vertical line VL passing through the rotation center of the differential case 50 (rotation axis X). As shown in FIG. 12, when viewing the oil catch unit 15 from above, the oil catch unit 15 is arranged at a position offset from directly above the differential case 50.

As shown in FIG. 8, the oil catch unit 15 is formed extending to the paper surface back side from the support wall part 146. A support stand 151 (shelf part) projecting to the paper surface front side is provided on the bottom edge of the oil catch unit 15. The support stand 151 is provided in a range on the paper surface front side from the support wall part 146, to the paper surface back side from the junction part 142 of the fourth box 14.

As shown in FIG. 7, seen from the rotation axis X direction, on the vertical line VL side (right side in the drawing) of the oil catch unit 15, the communication port 147 is formed with a portion of the support wall part 146 cut out. The communication port 147 communicates between the oil catch unit 15 and the housing unit 140 of the differential case 50.

Seen from the rotation axis X direction, the communication port 147 is provided in a range crossing the vertical line VL from the breather chamber 16 side (right side in the drawing) to the oil catch unit 15 side (left side in the drawing).

As shown in FIG. 9, in the present embodiment, during forward travel of the vehicle in which the power transmission device 1 is mounted, seen from the third box 13 side, the differential case 50 rotates in the counterclockwise direction CCW around the rotation axis X.

For that reason, the oil catch unit 15 is positioned at the downstream side in the rotation direction of the differential case 50. For the width in the circumferential direction of the communication port 147, the left side sandwiching the vertical line VL is wider than the right side. The left side sandwiching the vertical line VL is at the downstream side in the rotation direction of the differential case 50, and the right side is the upstream side. As a result, much of the oil OL scooped up by the differential case 50 rotating around the rotation axis X is made to be able to flow into the oil catch unit 15.

Furthermore, as shown in FIG. 12, the outer circumference position of the rotational orbit of a second shaft part 446 of the pinion shaft 44 noted above and the outer circumference position of the rotational orbit of the large diameter gear part 431 are offset in the radial direction of the rotation axis X. The outer circumference position of the rotational orbit of the second shaft part 446 is positioned more to the inner diameter side than the outer circumference position of the rotational orbit of the large diameter gear part 431.

For that reason, there is a spatial margin at the outer diameter side of the second shaft part 446. By providing the oil catch unit 15 using this space, it is possible to effectively use the space inside the body box 10.

As shown in FIG. 12, the second shaft part 446 projects to the back side of the small diameter gear part 432 seen from the motor 2. The peripheral member of the second shaft part 446 (e.g. the guide unit 78 of the differential case 50 that supports the second shaft part 446) is at a position near the oil catch unit 15.

Thus, it is possible to smoothly perform supplying of the oil OL (lubricating oil) from that peripheral member to the oil catch unit 15.

As shown in FIG. 8, the end part of the outer diameter side of the oil hole 151a is open at the back side of the support stand 151. The oil hole 151a extends to the inner diameter side inside the fourth box 14. The end part of the inner diameter side of the oil hole 151a is open on the inner circumference of the support unit 145.

As shown in FIG. 2, the end part of the inner diameter side of the oil hole 151a in the support unit 145 is open between the lip seal RS and the bearing B2.

As shown in FIG. 10 and FIG. 12, an oil guide 152 is placed on the support stand 151.

The oil guide 152 has a catch unit 153, and a guide unit 154 extending from the catch unit 153 to the first box 11 side (paper surface front side in FIG. 10).

As shown in FIG. 12, seen from above, the support stand 151 is provided radially outside the rotation axis X, at a position partially overlapping the differential case 50 (first case unit 6, second case unit 7), and to avoid interference with the stepped pinion gear 43 (large diameter gear part 431).

Seen from the radial direction of the rotation axis X, the catch unit 153 is provided at a position overlapping the second shaft part 446 of the pinion shaft 44. Furthermore, the guide unit 154 is provided at a position where the first shaft part 445 of the pinion shaft 44 and the large diameter gear part 431 overlap.

For that reason, when the differential case 50 rotates around the rotation axis X, the oil OL scooped up by the differential case 50 moves toward the catch unit 153 and the guide unit 154 side.

A wall part 153a is provided extending in the direction separating (upward) from the support stand 151 on the outer circumference edge of the catch unit 153. A portion of the oil OL scooped up by the differential case 50 rotating around the rotation axis X is retained in the oil guide 152.

A notch part 155 is provided in the wall part 153a at the back side of the catch unit 153 (paper surface back side in FIG. 10).

The notch part 155 is provided in a region facing the oil hole 151a. A portion of the oil OL retained in the catch unit 153 is discharged from the notch part 155 portion toward the oil hole 151a.

The guide unit 154 is inclined downward as it separates from the catch unit 153. Wall parts 154a, 154a are provided at both sides in the width direction of the guide unit 154. The wall parts 154a, 154a are provided across the entire length in the lengthwise direction of the guide unit 154. The wall parts 154a, 154a are connected to the wall part 153a that surrounds the outer circumference of the catch unit 153.

For that reason, a portion of the oil OL retained in the catch unit 153 is also discharged to the guide unit 154 side.

As shown in FIG. 11, in the guide unit 154, the position that avoids interference with the differential case 50 extends to the second box 12 side. A tip 154b of the guide unit 154 faces an oil hole 126a provided on the wall part 120 of the second box 12 with a gap open in the rotation axis X direction.

A boss part 126 that surrounds the oil hole 126a is provided on the outer circumference of the wall part 120. One end of a pipe 127 is fitted into the boss part 126 from the rotation axis X direction.

The pipe 127 passes through the outside of the second box 12 to the third box 13. The other end of the pipe 127 communicates with the oil hole 136a provided in the cylindrical connecting wall 136 of the third box (see FIG. 2).

A portion of the oil OL scooped up by the differential case 50 rotating around the rotation axis X reaches the oil catch unit 15. The oil OL passes through the guide unit 154 and the pipe 127, and is supplied to the internal space Sc of the connecting wall 136.

As shown in FIG. 2, a radial oil passage 137 that communicates with the internal space Sc is provided in the third box 13.

The radial oil passage 137 extends radially downward from the internal space Sc. The radial oil passage 137 communicates with the axial oil passage 138 provided inside the junction part 132.

The axial oil passage 138 connects with the oil reservoir 128 provided at the bottom of the second box 12 via the communication hole 112a provided in the junction part 112 of the first box 11.

The oil reservoir 128 penetrates inside the peripheral wall part 121 in the rotation axis X direction. The oil reservoir 128 connects with the oil retaining part OP of the gear chamber Sb provided in the fourth box 14.

In the gear chamber Sb, the disc-shaped plate member 8 is provided facing orthogonal to the rotation axis X. As described above, in the plate member 8 (plate), the gear chamber Sb inside the fourth box 14 is partitioned into a first gear chamber Sb1 (first space) on the differential case 50 side, and a second gear chamber Sb2 (second space) on the motor 2 side.

The cooling chamber CR (second chamber) adjacent to the gear chamber Sb is provided at the bottom of the gear chamber Sb of the fourth box 14.

Figure 13:
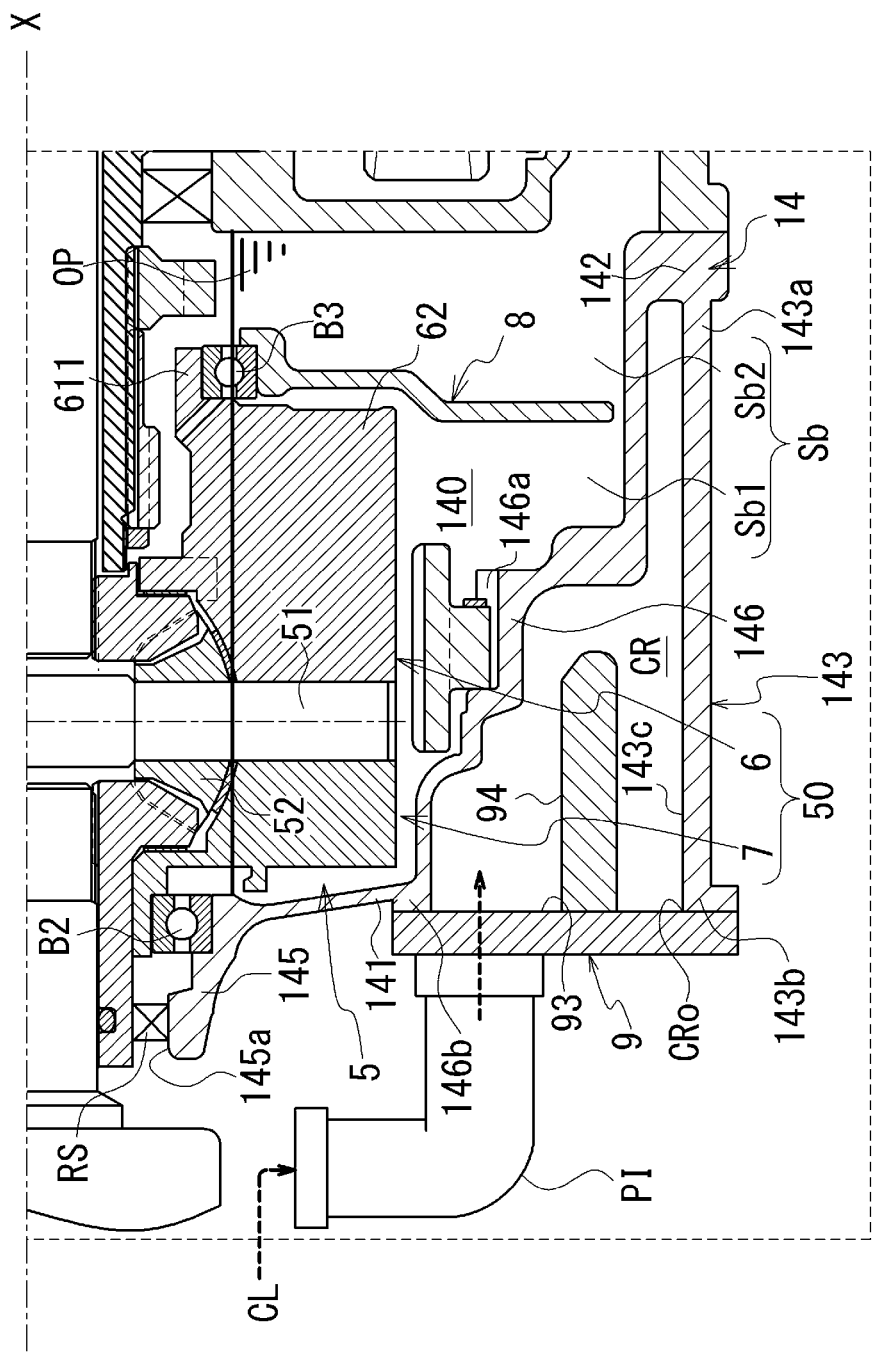
FIG. 13 is an enlarged view around a cooling chamber at the bottom of a fourth box.

FIG. 13 is an enlarged view of the bottom of the fourth box 14 around the cooling chamber CR.

Figure 14:
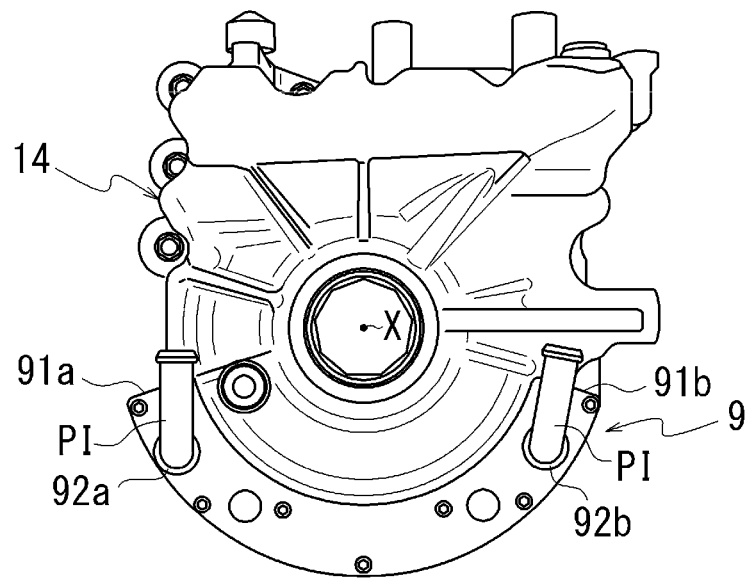
FIG. 14 is a drawing of the cooling chamber seen from the peripheral wall part side of the fourth box.

FIG. 14 is a drawing of the cooling chamber CR seen from the peripheral wall part 141 side (paper surface left side in FIG. 2) of the fourth box 14.

Figure 15:
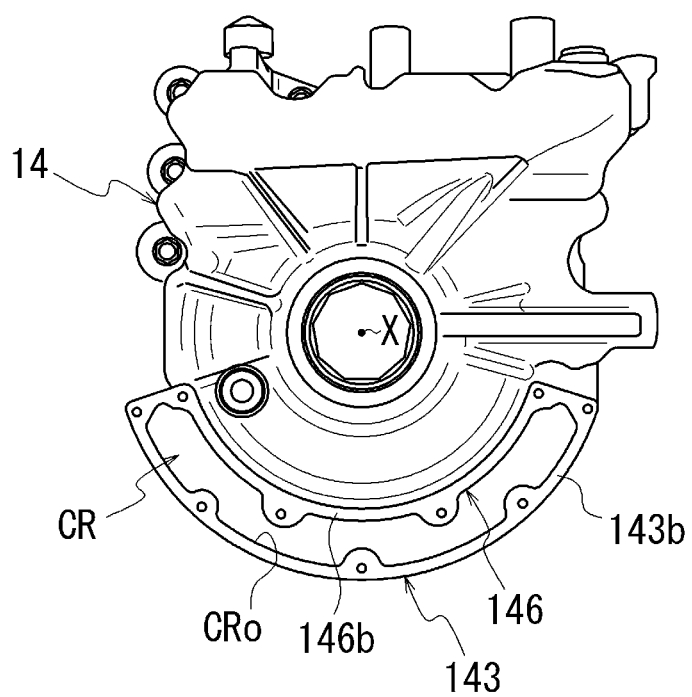
FIG. 15 is a drawing showing the state with the lid part of the cooling chamber removed.

FIG. 15 is a drawing showing the state with a lid part 9 removed from the cooling chamber CR.

Figure 16:
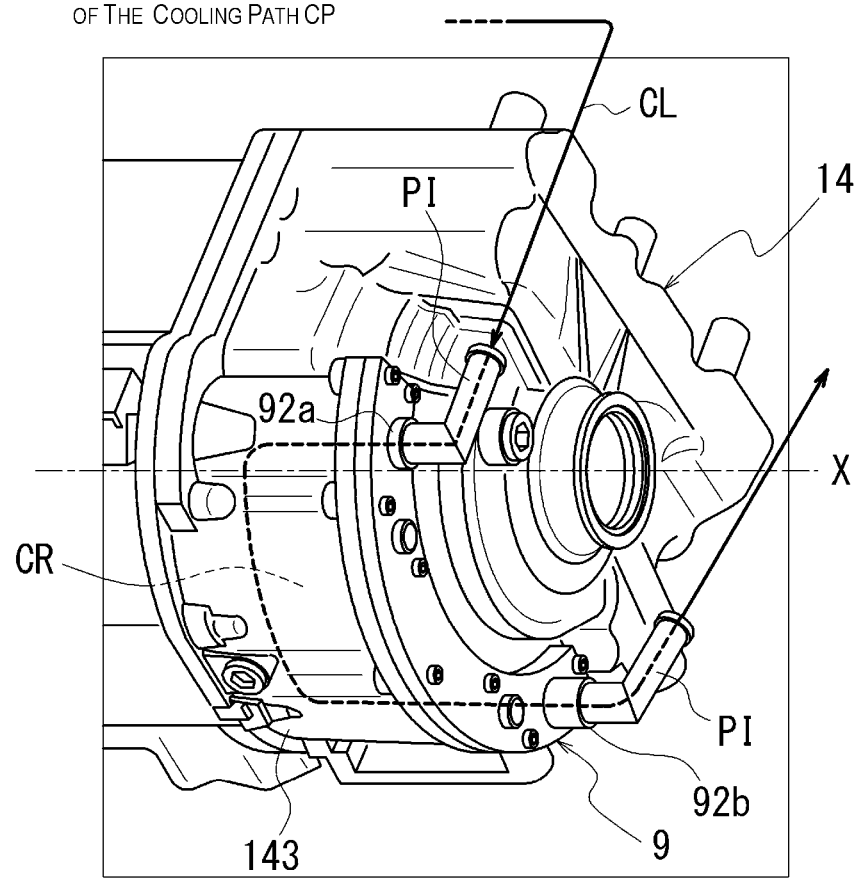
FIG. 16 is a drawing for explaining the flow of cooling liquid.

FIG. 16 is a drawing for explaining the flow of the cooling liquid CL.

FIG. 17 is a drawing showing the configuration of the lid part 9.

Figure 18:
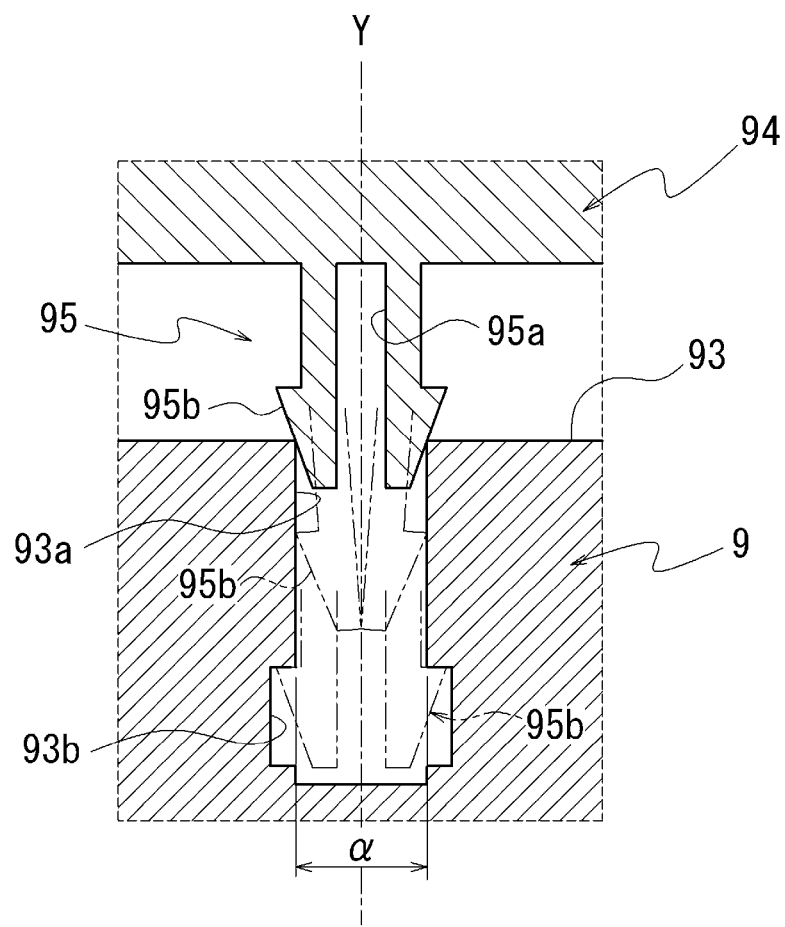
FIG. 18 is a drawing for explaining the assembly of a spacer to the lid part.

FIG. 18 is a drawing for explaining the assembly of a spacer 94 to the lid part 9.

Figure 19:
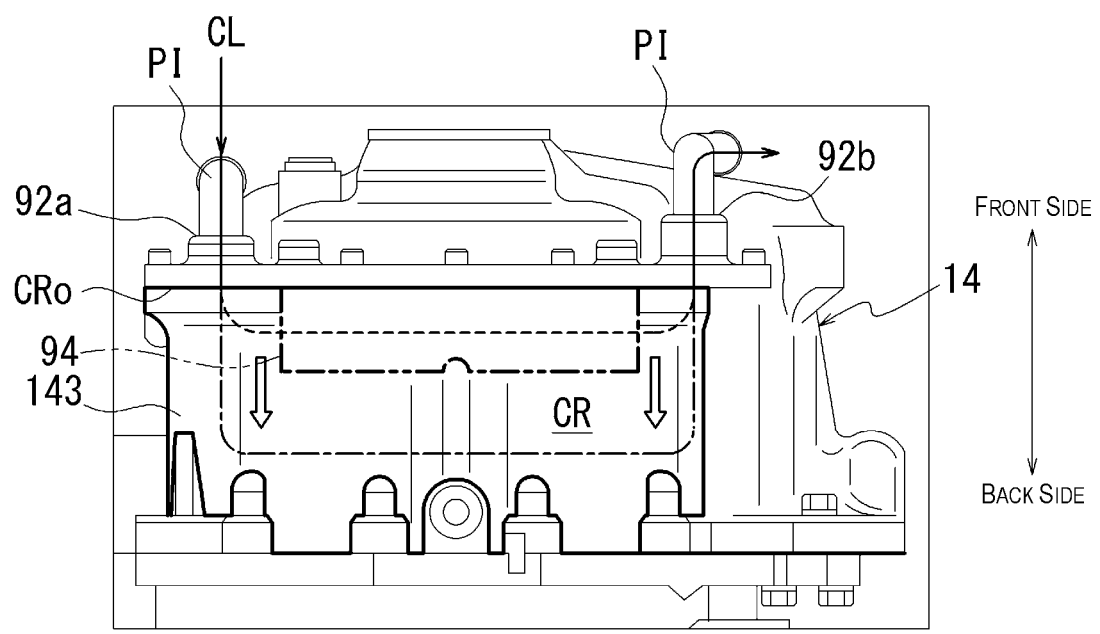
FIG. 19 is a drawing for explaining the flow of the cooling liquid in the cooling chamber.

FIG. 19 is a drawing for explaining the flow of the cooling liquid CL in the cooling chamber CR.

As shown in FIG. 13, the cooling chamber CR comprises a jacket part 143 and the lid part 9. Cooling liquid CL is introduced to inside the cooling chamber CR. As described above, the oil retaining part OP is formed at the bottom of the gear chamber Sb. The cooling liquid CL introduced in the cooling chamber CR cools the oil OL retained in the oil retaining part OP.

The jacket part 143 is a wall part that covers the outer circumference surface of the support wall part 146. As shown in FIG. 15, the jacket part 143 forms an arc shape along the cylinder-shaped support wall part 146 when seen from the rotation axis X direction. It is possible to form the jacket part 143 integrally with the support wall part 146 by casting, etc., for example.

As shown in FIG. 13, the jacket part 143 extends along the rotation axis X direction. A base end part 143a provided at one end side of the jacket part 143 in the rotation axis X direction is connected to the junction part 142 at the bottom part of the fourth box 14. A junction part 143b with the lid part 9 described later is provided at the end facing the base end part 143a.

An inner wall surface 143c of the jacket part 143 faces the outer circumference surface of the support wall part 146 via a gap. As shown in FIG. 15, an arc-shaped internal space is defined when seen from the rotation axis X direction between the jacket part 143 and the support wall part 146. This arc-shaped internal space becomes the interior of the cooling chamber CR. Also, an opening CRo of the cooling chamber CR is formed by the junction part 143b of the jacket part 143 and the junction part 146b of the support wall part 146.

The lid part 9 closes the opening CRo of the cooling chamber CR. As shown in FIG. 14, the lid part 9 is an arc-shaped plate-shaped member when seen from the rotation axis X direction.

An introduction port 92a and a discharge port 92b are respectively provided near one end 91a and the other end 91b in the circumferential direction of the rotation axis X of the lid part 9. The introduction part 92a and the discharge port 92b are holes penetrating the lid part 9 in the rotation axis X direction, and a pipe PI is connected to each. As shown in FIG. 16, the introduction port 92a of the lid part 9 is connected to the discharge port 124b of the cooling path CP via the pipe PI.

After flowing through the interior of the cooling path CP (see FIG. 2) and cooling the motor 2, the cooling liquid CL is discharged from the discharge port 124b of the cooling path CP. The cooling liquid CL passes through the pipe PI and is introduced from the introduction port 92a of the cooling chamber CR to the interior of the cooling chamber CR.

As shown in FIG. 16, the cooling liquid CL introduced to the cooling chamber CR flows in the inside of the cooling chamber CR. As a result, the support wall part 146 (see FIG. 15) that forms the cooling chamber CR is chilled. By the support wall part 146 which is also a part of the gear chamber Sb (see FIG. 13) being chilled, the oil OL retained in the oil retaining part OP inside the gear chamber Sb is cooled.

As shown in FIG. 16, the cooling liquid CL that has flowed through the interior of the cooling chamber CR is discharged from the discharge port 92b. The discharged cooling liquid CL passes through a pipe (not illustrated) arranged in the interior of the vehicle, and is again introduced in the introduction port 124a (see FIG. 2) of the cooling path CP.

As shown in FIG. 13, an end surface 93 of the lid part 9 faces the interior of the cooling chamber CR. The spacer 94 projecting to the interior of the cooling chamber CR is attached to the end surface 93. As shown in FIG. 17, the spacer 94 is an arc-shaped member the same as the lid part 9. The spacer 94 is attached between the introduction port 92a and the discharge port 92b of the lid part 9. As shown in FIG. 13, the spacer 94 is thick in the radial direction of the rotation axis X. The lid part 9 can be made of metal, for example, and the spacer 94 may be made of resin, for example.

As shown in FIG. 18, a projection 95 is provided for attaching the spacer 94 to the lid part 9. A hole 93a in which the projection 95 can be inserted is provided on the end surface 93 of the lid part 9. At the inner circumference surface of the hole 93a of the lid part 9, an annular groove 93b is formed. The projection 95 functions as an occlusal part with insertion possible in the axis line Y direction (one direction) with respect to the hole 93a. The number and installation locations of the holes 93a corresponding to the projections 95 is not limited, but a plurality of the spacers 94 may be provided to stably attach to the lid part 9.

A slit 95a cut along the axis line Y direction is formed on the projection 95 facing the base end from the tip end of the projection 95. There can be four slits 95a formed at 90° intervals in the circumferential direction around the axis line Y, for example.

Hook parts 95b projecting radially outward of the axis line Y are formed respectively on the tip end of each projection 95 separated by the slit 95a. The projection 95 is set to a size that matches an inner diameter a of the hole 93a. The hook part 95b is set to be larger than the inner diameter a of the hole 93a, and set to a size that fits in the annular groove 93b of the hole 93a.

When attaching the lid part 9, the projection 95 is pushed to one direction, specifically, toward the bottom part of the hole 93a. In FIG. 18, the movement of the projection 95 is shown by a double dot-dash line. When the hook part 95b of the tip of the projection 95 contacts the hole 93a, it is deflected by pressing force from the outer circumference, and the width of the slit 95a contracts. By contraction of the slit 95a, the outer diameter of the tip of the hook part 95b shrinks, and when it reaches a size that matches the inner diameter a of the hole 93a, the projection 95 is inserted in the hole 93a. When the tip of the projection 95 reaches the annular groove 93b, the hook part 95b is fitted in the annular groove 93b and the slit 95a returns to its original width. As a result, the projection 95 is in a state engaged with the hole 93a, and the spacer 94 is attached to the lid part 9.

This attachment mode is merely one example, and it is also possible to attach the spacer 94 to the lid part 9 using another attachment method such as fixing by bolts, etc.

As shown in FIG. 13, the cooling chamber CR is formed to straddle the first gear chamber Sb1 and the second gear chamber Sb2 when seen from the radial direction of the rotation axis X. The first gear chamber Sb1 is positioned at the opening CRo side which is the front side (left side in the drawing) of the cooling chamber CR. The second gear chamber Sb2 is positioned at the back side (right side in the drawing) of the cooling chamber CR separated from the opening CRo.

In a state with the lid part 9 closing the opening CRo of the cooling chamber CR, the spacer 94 is positioned at the front side (left side in the drawing) of the cooling chamber CR. The spacer 94, by being thick in the radial direction of the rotation axis X, acts as volume packing that makes the volume of the front side of the cooling chamber CR smaller. As shown by the dotted lines in FIG. 19, when there is no spacer 94, the flow of the cooling liquid CL from the introduction port 92a to the discharge port 92b is easily accumulated at the front side of the cooling chamber CR, and doesn't easily reach the back. On the other hand, when there is the spacer 94 as in the embodiment, the spacer 94 overhangs at the front side of the cooling chamber CR. As a result, as shown by the dot-dash line, the cooling liquid CL is guided to flow not only to the front side of the cooling chamber CR, but also to the back side. Specifically, the spacer 94 functions as a guide member that guides the cooling liquid CL introduced from the introduction port 92a in the direction separating from the opening CRo.

As shown in FIG. 13, in the first gear chamber Sb1 positioned at the top part of the front side (left side in the drawing) of the cooling chamber CR, the oil OL is scooped up by the differential case 50, so the flow of the oil OL is intense. On the other hand, at the second gear chamber Sb2 that is positioned at the top part of the back side (right side in the drawing) of the cooling chamber CR, the flow of the oil OL is relatively gentle. In light of that, by providing the spacer 94 and forming the flow of the cooling liquid CL facing the back side of the cooling chamber CR, it is possible for the cooling liquid CL to slowly cool the oil OL on the second gear chamber Sb2 side. As a result, it is possible to improve the overall cooling efficiency of the oil OL in the oil retaining part OP.

The operation of the power transmission device 1 of this configuration is explained.

As shown in FIG. 1, in the power transmission device 1, the planetary reduction gear 4, the differential mechanism 5, and the drive shafts DA, DB are provided along the transmission route of the output rotation of the motor 2.

As shown in FIG. 2, when the motor 2 is driven and the rotor core 21 rotates around the rotation axis X, the rotation is inputted to the sun gear 41 of the planetary reduction gear 4 via the motor shaft 20 that rotates integrally with the rotor core 21.

As shown in FIG. 3, with the planetary reduction gear 4, the sun gear 41 serves as the input unit of the output rotation of the motor 2. The differential case 50 that supports the stepped pinion gear 43 serves as the output unit of the inputted rotation.

When the sun gear 41 rotates around the rotation axis X by the inputted rotation, the stepped pinion gear 43 (large diameter gear part 431, small diameter gear part 432) rotates around the axis line X1 by the rotation inputted from the sun gear 41 side.

Here, the small diameter gear part 432 of the stepped pinion gear 43 is engaged with the ring gear 42 fixed to the inner circumference of the fourth box 14. For that reason, the stepped pinion gear 43 revolves around the rotation axis X while auto-rotating around the axis line X1.

Here, with the stepped pinion gear 43, the outer diameter R2 of the small diameter gear part 432 is smaller than the outer diameter R1 of the large diameter gear part 431 (see FIG. 3).

As a result, the differential case 50 (first case unit 6, second case unit 7) that supports the stepped pinion gear 43 rotates around the rotation axis X at a rotation speed lower than the rotation inputted from the motor 2 side.

For that reason, the rotation inputted to the sun gear 41 of the planetary reduction gear 4 is significantly reduced by the stepped pinion gear 43. The reduced rotation is outputted to the differential case 50 (differential mechanism 5).

By the differential case 50 rotating around the rotation axis X by the inputted rotation, inside the differential case 50, the drive shafts DA, DB that engage with the pinion mate gear 52 rotate around the rotation axis X. As a result, drive wheels W, W (see FIG. 1) at the left and right of the vehicle in which the power transmission device 1 is mounted rotate by the transmitted rotational drive power.

As shown in FIG. 2, the oil retaining part OP for retaining the oil OL for lubrication is formed inside the fourth box 14. The oil OL retained in the oil retaining part OP is scooped up by the differential case 50 rotating around the rotation axis X during transmission of the output rotation of the motor 2.

The engagement part between the sun gear 41 and the large diameter gear part 431, the engagement part between the small diameter gear part 432 and the ring gear 42, and the engagement part between the pinion mate gear 52 and the side gears 54A, 54B are lubricated by the scooped-up oil OL.

As shown in FIG. 9, the differential case 50 seen from the third box 13 side rotates in the counterclockwise direction CCW around the rotation axis X.

The oil catch unit 15 is provided on the top part of the fourth box 14. The oil catch unit 15 is positioned at the downstream side in the rotation direction of the differential case 50. Much of the oil OL scooped up by the differential case 50 flows into the oil catch unit 15. The oil OL is supplied to the oil guide 152 placed on the support stand 151 inside the oil catch unit 15.

In this way, most of the oil OL scooped up by the differential case 50 flows into the oil catch unit 15. A portion of the oil OL drops due to gravity, and returns to the oil retaining part OP and is retained. As shown in FIG. 13, the cooling chamber CR in which the cooling liquid CL flows is provided at the bottom of the oil retaining part OP. The temperature of the oil OL scooped up by the differential case 50 rises, but the oil OL that returns to the oil retaining part OP is cooled by heat exchange with the cooling liquid CL. The cooled oil OL is again scooped up by the differential case 50 and used for lubrication.

The cooling liquid CL that cools the oil OL in the oil retaining part OP is introduced to the cooling chamber CR after flowing through the cooling path CP (see FIG. 2). Specifically, in the embodiment, the cooling liquid CL used for cooling the motor 2 is also used for cooling the oil OL, so there is no need to provide new cooling liquid CL for cooling the oil OL. Also, in the embodiment, by having the motor 2 which has a higher priority for cooling be cooled before the oil OL, it is possible to perform suitable heat management in the overall power transmission device 1.

As described above, the power transmission device 1 of the present embodiment has the following configuration.

(1) The power transmission device 1 comprises
the motor 2,
the planetary reduction gear 4 and the differential mechanism 5 (gear mechanism) that are connected downstream from the motor 2, and
the fourth box 14 (box) that houses the planetary reduction gear 4 and the differential mechanism 5.

The gear chamber Sb (first chamber) in which the planetary reduction gear 4, the differential mechanism 5, and the oil OL are housed is formed in the fourth box 14.

The cooling chamber CR (second chamber) that is adjacent to the gear chamber Sb and in which the cooling liquid CL is introduced is formed in the fourth box 14.

The gear chamber Sb that houses the planetary reduction gear 4 and the differential mechanism 5 is formed inside the fourth box 14. The oil OL that lubricates the planetary reduction gear 4 and the differential mechanism 5 is housed inside the gear chamber Sb. The cooling chamber CR is formed adjacent to the gear chamber Sb. The support wall part 146 that partitions the gear chamber Sb and the cooling chamber CR is chilled by the cooling liquid CL introduced inside the cooling chamber CR. Using the chilled support wall part 146, it is possible to cool the oil OL inside the gear chamber Sb. In the embodiment, it is possible to increase the cooling efficiency of the oil OL. The cooling chamber CR is formed in the the fourth box 14 itself. Compared to when a separate member to the fourth box 14 is provided to chill the support wall part 146, it is possible to increase the cooling efficiency, and this also leads to a more compact power transmission device 1.

(2) The cooling chamber CR is formed adjacent to the bottom of the gear chamber Sb.

The oil OL, after being stirred by the planetary reduction gear 4, is retained in the oil retaining part OP at the bottom of the gear chamber Sb. By forming the cooling chamber CR adjacent to the bottom of the gear chamber Sb, it is possible to directly cool the oil OL in the oil retaining part OP, so it is possible to increase the cooling efficiency.

(3) The cooling chamber CR is configured as an arc shape when seen from the rotation axis X direction (axial direction).

When the cooling chamber CR is an arc shape, it is possible to form it to follow the cylindrical support wall part 146 of the fourth box 14, so it is possible to suppress an increase in size of the power transmission device 1.

(4) The power transmission device 1 has
the lid part 9 attached to the opening CRo of the cooling chamber CR.

The lid part 9 has the introduction port 92a of the cooling liquid CL and the discharge port 92b of the cooling liquid CL.

The power transmission device 1 has the spacer 94 (guide member) that guides the cooling liquid CL introduced from the introduction port 92a in a direction separating from the opening CRo.

When the introduction port 92a and the discharge port 92b of the cooling liquid CL are provided in the lid part 9 of the cooling chamber CR, it is easier to have the flow of the cooling liquid CL near the lid part 9. In light of that, by providing the spacer 94 and guiding the cooling liquid CL to flow to the back side separated from the opening CRo, it is possible to increase the cooling efficiency.

(5) The power transmission device 1 has
the plate member 8 (plate) that divides the inside of the gear chamber Sb into the first gear chamber Sb1 (first space) in which the planetary reduction gear 4 and the differential mechanism 5 are arranged, and the second gear chamber Sb2 (second space) in which the planetary reduction gear 4 is not arranged.

The spacer 94 guides the cooling liquid CL from the first gear chamber Sb1 side toward the second gear chamber Sb2 side.

The flow of the oil OL is intense in the first gear chamber Sb1 provided with the planetary reduction gear 4. On the other hand, the flow of the oil OL is relatively gentle in the second gear chamber Sb2 that is not provided with the planetary reduction gear 4. By the spacer 94 forming the flow of the cooling liquid CL toward the second gear chamber Sb2 side, it is possible to slowly cool the oil OL at the second gear chamber Sb2 side, and possible to improve the cooling efficiency.

(6) The spacer 94 is attached to the lid part 9.

As a result, it is possible to simplify the step of attaching the lid part 9 and the spacer 94 to the opening CRo.

(7) The spacer 94 is attached to the lid part 9 by the projection 95 (occlusal part) for which insertion is possible in the axis line Y direction (one direction) being introduced in the lid part 9.

As a result, it is possible to easily attach the spacer 94 to the lid part 9, and possible to simplify the attachment step.

(8) In the power transmission device 1, the cooling liquid CL that cooled the motor 2 is introduced in the cooling chamber CR.

By the cooling liquid CL of the motor 2 also being used for cooling the oil OL in the gear chamber Sb, it is not necessary to prepare new cooling liquid CL. Also, after the motor 2 is cooled, the oil OL of the gear chamber Sb is cooled. As a result, it is possible to cool the motor 2 with priority, so it is possible to suitably perform heat management for the overall power transmission device 1.

Above, embodiments of the invention of the present application were explained, but the invention of the present application is not limited only to the modes shown in the embodiments. It can be modified as appropriate within the scope of the technical concepts of the invention.

EXPLANATION OF CODES

1: Power transmission device; 14: Fourth box; 146: Support wall part; 2: Motor; 4: Planetary reduction gear (gear mechanism); 5: Differential mechanism (gear mechanism); 8: Plate member (plate); 9: Lid part; 92a: Introduction port; 92b: Discharge port; 94: Spacer (guide member); 95: Projection; CL: Cooling liquid; CR: Cooling chamber (second chamber); CRo: Opening; OL: Oil; Sb: Gear chamber (first chamber); Sb1: First gear chamber (first space); Sb2: Second gear chamber (second space); X: Rotation axis; and Y: Axis line.

The invention claimed is:

1. A power transmission device comprising:
a motor;
a gear mechanism connected downstream of the motor, the gear mechanism being lubricated by oil; and
a box having
a wall part that covers an outer circumference of the gear mechanism, and
a jacket part that covers an outer circumference of the wall part,
a cooling chamber, in which cooling liquid is introduced, being formed between the wall part and the jacket part, wherein
the cooling chamber includes a portion that overlaps with the gear mechanism when seen from a radial direction, and a portion that overlaps the gear mechanism when seen from an axial direction.

2. The power transmission device according to claim 1, wherein
the cooling chamber a portion having an arc shape when seen from the axial direction,
in the portion having the arc shape, a portion that overlaps the gear mechanism when seen from the radial direction has a portion that overlaps the gear mechanism when seen from the axial direction.

3. The power transmission device according to claim 1, wherein
the cooling chamber has a portion that overlaps a space between the gear mechanism and the motor when seen from the radial direction.

4. The power transmission device according to claim 3, wherein
the space does not overlap the gear mechanism.

5. The power transmission device according to claim 1, wherein
the gear mechanism has a stepped pinion gear having a small diameter part and a large diameter part, and a planetary gear mechanism having a pinion shaft that supports the pinion gear, and
in the cooling chamber, a portion that overlaps the pinion shaft when seen from the radial direction has a portion that overlaps the large diameter gear part of the stepped pinion gear when seen from the axial direction.

6. The power transmission device comprising:
a motor;
a gear mechanism that is connected downstream of the motor, the gear mechanism being lubricated by oil;
a plate; and
a box having
a wall part that covers an outer circumference of the gear mechanism, and
a jacket part that covers an outer circumference of the wall part,
a cooling chamber, in which cooling liquid is introduced, being formed between the wall part and the jacket part,
a housing unit, in which the oil and the gear mechanism are housed, being formed on an inner circumference of the wall part, wherein
the plate divides the housing unit into a first space in which the gear mechanism is arranged, and a second space in which the gear mechanism is not arranged, and
when seen from a radial direction, the cooling chamber has a portion that overlaps the second space.

7. The power transmission device according to claim 6, further comprising
inside the cooling chamber, a guide unit that guides the cooling liquid from a first space side toward a second space side.

8. The power transmission device comprising:
a motor;
a gear mechanism that is connected downstream of the motor, the gear mechanism being is lubricated by oil; and
a box having
a wall part that covers an outer circumference of the gear mechanism, and
a jacket part that covers an outer circumference of the wall part,
between the wall part and the jacket part, a cooling chamber being formed in which cooling liquid is introduced via an introduction port, and the cooling liquid is discharged via a discharge port, wherein
in an interior of the cooling chamber, a spacer is provided that projects in an axial direction away from the introduction port, and a tip of an axial direction side of the spacer faces a wall of the axial direction side in the interior of the cooling chamber with a gap open, and
when seen from the axial direction, the introduction port and the discharge port are arranged to sandwich the spacer in a circumferential direction.

9. The power transmission device according to claim 8, wherein
the spacer has a portion having an arc shape.

10. The power transmission device according to claim 8, further comprising a plate, wherein
the plate divides an inner circumference of the wall part into a first space in which the gear mechanism is arranged and a second space in which the gear mechanism is not arranged, and
when seen from a radial direction, the cooling chamber has a portion that overlaps the second space.

* * * * *